United States Patent [19]
Wang et al.

[11] Patent Number: 5,617,236
[45] Date of Patent: Apr. 1, 1997

[54] INFRARED COMMUNICATION DEVICE FOR MULTISTANDARD OPERATIONS

[75] Inventors: Li-Chen Wang, Watsonville; Keming Yeh, Fremont, both of Calif.

[73] Assignee: ACTiSYS Corporation, Fremont, Calif.

[21] Appl. No.: 290,330

[22] Filed: Aug. 15, 1994

[51] Int. Cl.$^6$ ............................. H04B 10/10; H04B 10/16
[52] U.S. Cl. ........................ 359/172; 359/176; 359/137; 375/214
[58] Field of Search ................................. 359/174–176, 359/172, 137, 152–153; 375/214

[56] References Cited

U.S. PATENT DOCUMENTS

| | | | |
|---|---|---|---|
| 4,777,662 | 10/1988 | Nakata | 455/607 |
| 4,852,087 | 7/1989 | Rackin | 370/76 |
| 4,884,287 | 11/1989 | Jones et al. | 375/121 |
| 5,086,454 | 2/1992 | Hirzel | 379/98 |
| 5,224,154 | 6/1993 | Aldridge et al. | 379/93 |
| 5,239,652 | 8/1993 | Seibert et al. | 395/750 |
| 5,276,703 | 1/1994 | Budin | 375/1 |
| 5,331,634 | 7/1994 | Fischer | 370/94.1 |
| 5,387,993 | 2/1995 | Heller | 359/172 |
| 5,428,806 | 6/1995 | Pocrass | 395/800 |
| 5,428,819 | 6/1995 | Wang | 455/33.1 |

FOREIGN PATENT DOCUMENTS

| | | | |
|---|---|---|---|
| 0190146 | 7/1989 | Japan | 359/172 |
| 0216634 | 8/1989 | Japan | 359/176 |
| 8906459 | 7/1989 | WIPO | 359/176 |

OTHER PUBLICATIONS

Nakata et al, "In House Wireless Communication System Using Infrared Radiation" International Conference on Computer Communication, 1984.

Primary Examiner—Leslie Pascal
Attorney, Agent, or Firm—Skjerven, Morrill, MacPherson, Franklin & Friel; Edward C. Kwok

[57] ABSTRACT

An IR interface device is connected over a wired port to a host computer, so as to provide an IR communication link between the host computer and another computing device capable of IR communication. Such an IR interface device may also include a coupling to a printer device. An IR conference device allows communication between devices using different IR communication protocols by providing individual IR communication links to each of the communicating devices and passing data between the individual IR communication links. An IR transceiver integrated circuit with automatic gain control is provided.

23 Claims, 39 Drawing Sheets

KEY TO FIG. 4b

| FIG. 4b-1 | FIG. 4b-2 |
|---|---|
| | FIG. 4b-3 |

'RXD GATE' block diagram

'RXD GATE' timing diagram

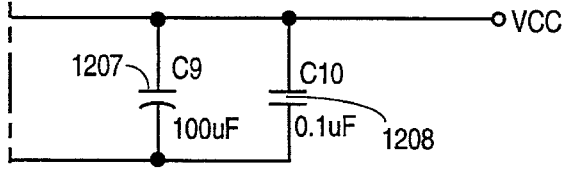
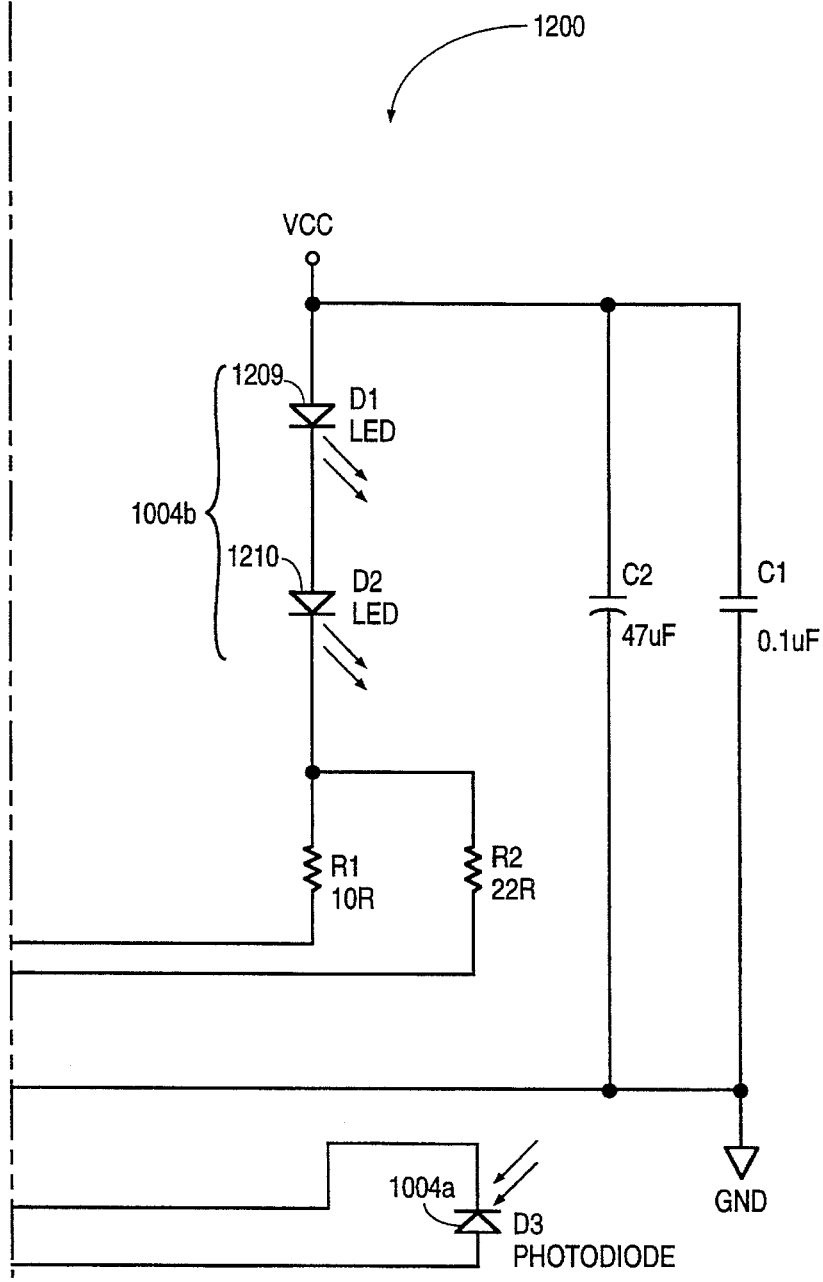

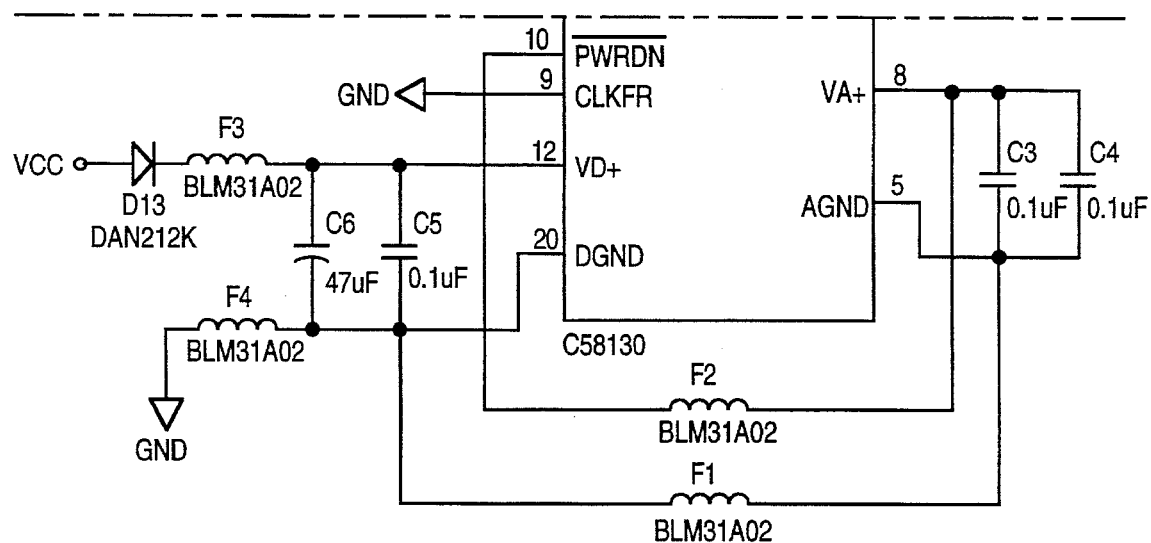
FIG. 12d
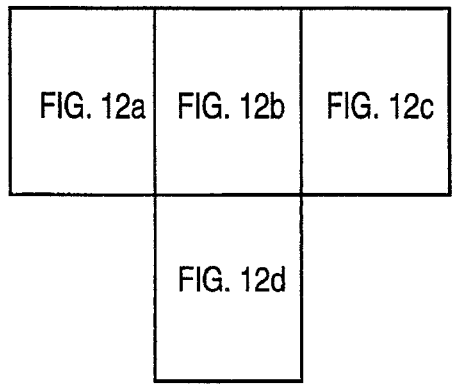

INFRARED COMMUNICATION DEVICE FOR MULTISTANDARD OPERATIONS

BACKGROUND OF THE INVENTION

1. Field of the Invention

The present invention relates to wireless communication; and, in particular, relates to wireless communication using radiation in the infrared (IR) range of frequencies ("IR frequencies").

2. Discussion of the Related Art

Wireless communication using IR frequencies have been used extensively in remote control applications of appliances and consumer electronics products. Recently, IR transceivers are also used for data communication applications in devices such as personal digital assistants (PDAs) and portable computers.

In the past, for remote control applications in appliances and consumer electronic devices, a 38 KHz amplitude shift-key (ASK) informal standard (the "VCR" standard) is widely used among manufacturers to allow interoperability of IR remote control devices. Today, however, most PDAs and portable computers use different signal modulation schemes and proprietary communication protocols. For example, the "Wizard" line of "palmtop" computers, from Sharp Electronics Corp., and the "Newton" PDAs, from Apple Computers Inc. share a common protocol and a 500 KHz ASK signal modulation scheme ("SHARP" modulation scheme and protocol), which is not compatible with IR transceivers in other palmtop computers, such as those manufactured by Hewlett-Packard company, which use a signal modulation scheme ("HP-SIR scheme") involving a single signal pulse per period.

For IR communication to achieve wide acceptance in data communication applications, a uniform signal modulation scheme and communication protocol ("uniform IR communication standard") is required, for example, in an IR-linked network. Such a uniform IR communication standard allows communication among a potentially large number of devices, such as portable computers, printers, file servers, and other desktop computers and workstations. For this purpose, the "Infrared Data Association" (IrDA) is formed to propose such a uniform IR communication standard ("IrDA standard") for all IR data communications. At this time, the IrDA standard uses the HP-SIR scheme at the "physical layer" and an HLDC-SIR communication protocol at the "link layer". This IrDA standard supports these bit rates: 2.4 Kbps, 9.6 Kbps, 19.2 Kbps, 38.4 Kbps, 57.6 Kbps, and 115.2 Kbps.

Because of the large number of communication standards used in today's IR communication, at both the physical and the link layers, a communication device which handles all the underlying signal modulation and protocol translations to allow two or more IR-capable devices to communicate without user intervention is clearly desirable. Furthermore, an external communication device which can be used as an attachment to provide an electronic device IR capability is also desired.

Unlike remote control applications, in which only one-way communication is required, most data communication applications are bidirectional: i.e. data is both received and transmitted in each device. In IR communication, unlike most other media, proper reception in a device's receiver can be interfered by reflections ("echoes") of the device's own transmitted signal. Two undesirable side effects can result from such an interference. First, the reflected signal can be mistaken for a signal to be received. Second, the strength of a device's own echo can interfere with the receiver's automatic gain control (AGC) circuit, which is often present in a receiver circuit to automatically compensate for signal strength of the incoming signal. Such an interference results in a high error rate because of improper amplification of the received signal. To alleviate these undesirable effects, two solutions are proposed: (i) echoes can be eliminated by software and (ii) AGC circuits should not be used. However, neither solution is satisfactory because (i) elimination of echoes by software is a complex operation, leading to undue complexity in the resulting circuit, and (ii) AGC circuits are desirable because the device must adapt to a wide range of signal strengths and environmental conditions under which a device using IR communication can be used.

SUMMARY OF THE INVENTION

In accordance with the present invention, an infrared radiation (IR) interface device is provided. The IR interface device includes (i) a wired input/output (I/O) port for receiving from a host computer data to be transmitted and for providing to the host computer data received by the IR interface device; (ii) an IR transceiver for transmitting data modulated for transmission as IR signals, and for receiving modulated data from IR signals detected; and (iii) a central processing unit, coupled to the wired port and the IR transceiver, for (i) modulating the data to be transmitted, and (ii) demodulating the modulated data received as data received by the IR interface device.

In one embodiment of the present invention, the IR interface device further includes a non-volatile semiconductor memory for storing firmware executed by the central processing unit. The IR interface device may further include a second wired I/O port for providing data received by the IR interface device to an electronic device, such as a printer. Also, the IR interface device may further include a volatile memory for storing data received by the IR interface device.

In another embodiment of the present invention, the IR interface device further includes a power supply circuit, which receives power from one of the following sources: (i) an external power supply, (ii) a battery housed in the IR interface device, and (iii) a signal line of the host computer coupled to the wired port.

The IR interface device converts an I/O port of a data device, e.g. a printer or a portable computer, into an IR communication port. Further, the IR interface device of the present invention allows the IR communication port thus achieved to use a large number of different IR protocols and signal modulation schemes.

In accordance with another aspect of the present invention, an infrared radiation (IR) conference device is provided. The IR conference device includes: (i) a housing including first and second windows through which IR signals can be transmitted or received; (b) first and second IR transceivers, each IR transceiver located within the housing behind a corresponding window for transmitting data as IR signals through such window, and for receiving modulated data from IR signals detected through the corresponding window; and (c) a central processing unit, coupled to each of the IR transceivers, for (i) demodulating data received at the first window, in accordance with a first signal modulating scheme and protocol, and modulating the data received at the first window, in accordance with a second signal modulation scheme and protocol, for transmission at the second window, and (ii) demodulating data received at the second window, in accordance with the second signal modulation scheme and protocol, and modulating the data received at the second window, in accordance with the first signal modulation scheme and protocol, for transmission at the first window. In one embodiment, two additional windows are provided to allow a third and a fourth IR-capable electronic devices to communicate simultaneously among themselves and with the devices associated with the first and the second windows.

In one embodiment of the present invention, the IR conference device includes a non-volatile semiconductor memory for storing firmware executed by the central processing unit. The IR interface device can also include a random access memory for storing data received by the IR conference device.

In one embodiment, the IR conference device includes a power supply circuit, which receives power from one of the following sources: (i) an external power supply, and (ii) a battery housed in the housing of the IR conference device.

The IR conference device of the present invention allows two IR-capable devices to communicate simultaneously, even though these IR-capable devices may operate under different protocols or signal modulation schemes. In addition, the IR conference device allows sharing of data and graphics simultaneously by a number of IR-capable participants.

In accordance with another aspect of the present invention, an infrared radiation (IR) transceiver integrated circuit is provided, the IR transceiver integrated circuit includes: (a) a control circuit for processing data received and data to be transmitted as IR signals; (b) a subcarrier generator circuit for generating a subcarrier signal; (c) a modulator circuit for modulating the data to be transmitted with the subcarrier signal to provide a modulated data signal; (d) a driver circuit for driving an external light emitting diode in accordance with the modulated data signal; (e) a receiver circuit for (i) amplifying and detecting IR signals received in an external phototodetector and (ii) providing the IR signals to the control circuit as the data received; (f) an automatic gain control circuit for adjusting the gain of the receiver circuit in accordance with strengths of the IR signals received; and (g) a detection circuit for detecting when data transmission, and for disabling the automatic gain control circuit for a period of time equal to the time of transmission plus a predetermined time period.

In one embodiment, the infrared radiation (IR) transceiver integrated circuit includes a power management circuit which provides a "power-down" signal when the power management circuit detects a time period of a predetermined length during which neither data received nor data to be transmitted are processed in the control circuit.

In one embodiment of the present invention, the infrared radiation (IR) transceiver integrated circuit receives control signals from a host device at a predetermined baud rate.

The IR transceiver integrated circuit of the present invention provides an integrated circuit which transform a conventional serial interface, i.e. universal asynchronous receiver/transmitter (UART), into an IR-capable transceiver. Furthermore, the IR transceiver integrated circuit of the present invention includes an automatic gain control circuit to adapt for different incoming signal strength of IR signals.

In accordance with another aspect of the present invention, a power supply circuit is provided for powering a first electronic circuit from a signal line in a second electronic circuit. Such a power circuit is used where the signal line attains a voltage higher than a voltage at the power supply terminal of the first electronic circuit. The power supply circuit of the present invention includes: (a) means for coupling the ground terminals of the first and second electronic circuits to form a common ground terminal; (b) a diode having an anode coupled to the signal line; (c) a capacitor coupled between the common ground terminal and the cathode of the diode, such that the signal line charges the capacitor with a charging current through the diode; (d) a step-down voltage regulator coupled to the capacitor for providing an output current having a peak and average currents greater than the charging current; and (e) means for coupling the supply voltage to the power supply terminal of the first electronic circuit.

In one embodiment, the power supply circuit is provided between a RS232C port and a circuit operating at CMOS voltage levels, and where the signal line carries an output signal of the RS232C port.

The power supply circuit of the present invention allows an IR transceiver integrated circuit and an IR light emitting diodes in an IR transceiver to be powered by one or more signal lines in a port of a host computer, even though the average current and peak current requirements are greater than the typically current deliverable by such a signal line.

In accordance with another aspect of the present invention, an interface circuit between a signal terminal of a first electronic circuit and a signal terminal of a second electronic circuit is provided. The interface circuit is provided where the first electronic circuit operates at a voltage range including a voltage higher than a voltage at the power supply terminal of the second electronic circuit. The interface circuit of the present invention includes: (a) means for coupling the ground terminals of the first and second electronic circuits to form a common ground terminal; (b) means for coupling the signal terminal of the first electronic circuit to the signal terminal of the electronic circuit; (c) a first diode having an anode coupled to the signal terminal of the second electronic circuit, and a cathode coupled to the power supply terminal of the second electronic circuit; and (d) a second diode having an anode coupled to the ground terminal of the second electronic circuit, and a cathode coupled to the signal terminal of the second electronic circuit.

In one embodiment of the present invention, the interface circuit is encased in an interface cable for coupling a RS232C port to a port of a palmtop computer. The interface circuit may include a resistor for limiting currents in the first and second diodes.

The interface circuit of the present invention provides a very economical link cable between two ports of two devices using RS232 and CMOS voltage levels respectively.

In accordance with another aspect of the present invention, an infrared radiation (IR) interface device is provided. Such an IR interface device includes (a) a first interface circuit, including a serial port connector, for transmitting data and receiving data to and from a serial port of a first electronic device coupled via the serial port connector; (b) an IR transceiver circuit for receiving and transmitting IR signals in accordance with a signal demodulation scheme and a signal modulation scheme, respectively; (c) a protocol control logic circuit for (i) receiving the demodulated IR signals, extracting data from the demodulated IR signals, and providing the extracted data to the first interface circuit for transmission to the first electronic device; and (ii) receiving data from the first electronic device, and providing the data received from the first electronics device to the interface circuit, for transmission as IR signals under the signal modulation scheme. In one embodiment of the present invention, such an IR interface device is powered by the first electronic device via a signal line in the serial connector. In another embodiment, the transceiver circuit and the protocol control logic circuit is included in an IR transceiver integrated circuit.

In accordance with another aspect of the present invention, the serial IR interface device is provided a parallel-to-serial interface device, so that IR-capability can be provided to an electronic device with a parallel port. In one embodiment, the parallel-to-serial interface device as the "first electronic device" described above. In one embodiment, this parallel-to-serial interface device includes (a) a second interface circuit, including a parallel port connector, for transmitting data and receiving data from a parallel port of a second electronic device coupled via the parallel port connector; and (b) an embedded controller, coupled to the second interface circuit for (i) providing the data received from the parallel port of the second electronic device serially to the first interface circuit via the serial port connector; and (ii) providing the data transmitted on the serial port to the second interface circuit for transmission to the second electronic device over the parallel port. In one embodiment, the embedded controller includes a mask-programmed read-only memory. In another embodiment, the IR interface device comprises a static random access memory accessed by said embedded controller.

The IR interface device of the present invention allows the conversion of a serial or parallel port of a data device into an IR communication port. Because the IR interface device of the present invention can be powered in accordance with the present invention by one or more signal lines of the serial or parallel port of the data device, without the use of an external power supply, the IR interface device of the present invention can be easily mounted at the end of a conventional link cable, thereby providing portability and manufacturing convenience.

The present invention is better understood upon consideration of the detailed description below and the accompanying drawings.

BRIEF DESCRIPTION OF THE DRAWINGS

FIG. 3a is a schematic diagram of power supply circuit 156 shown in FIG. 2a.

FIG. 3b is a schematic diagram of an interface circuit 151 between printer 130 and IR interface device 100 shown in FIG. 2a.

FIG. 7b is a signal timing diagram showing the relationship between the transmitted IR signal "txdir" and the "rxdgate" signal of FIG. 7a.

FIG. 10b shows a system 1050, including a printer 1053 coupled to an IR interface device 1060 over a conventional "Centronics" cable 1052, in accordance with the present invention; IR interface device 1060 includes a parallel-to-serial interface device 1051 and IR interface device 1001 of FIG. 10a.

FIG. 11a is a block diagram of IR interface device 1001 of FIG. 10a.

DETAILED DESCRIPTION OF THE PREFERRED EMBODIMENTS

Figure 1A:
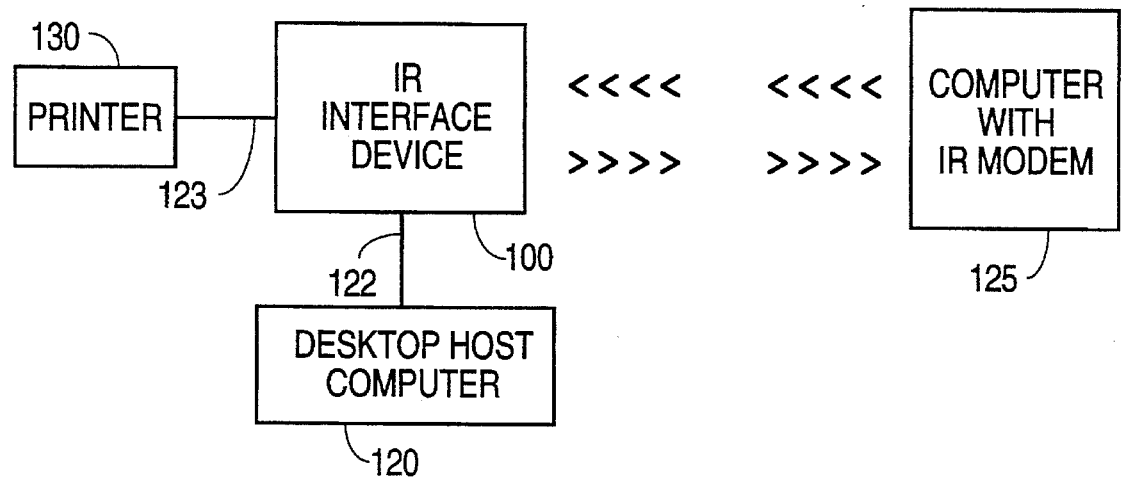
FIG. 1a shows an IR interface device 100 providing IR interfaces to a host computer 120 and a printer 130, in accordance with the present invention; host computer 120 and printer 130 communicates with IR interface device 100 over wired links.

The present invention provides a communication device which can operate in a multistandard IR environment. In accordance with the present invention, an IR interface device 100 is shown in FIG. 1a providing IR interfaces to host computer 120 and printer 130. As shown in FIG. 1a, host computer 120 and printer 130 are connected to IR interface device 100 over wired links 122 and 123, respectively. IR interface device 100 provides host computer 120 and printer 130 IR links for communicating with computer system 125, which is likewise provided an IR communication capability. The IR communication capability of computer 125 can also be implemented by an integrated circuit IR modem to be described in greater detail below.

Figure 2A:
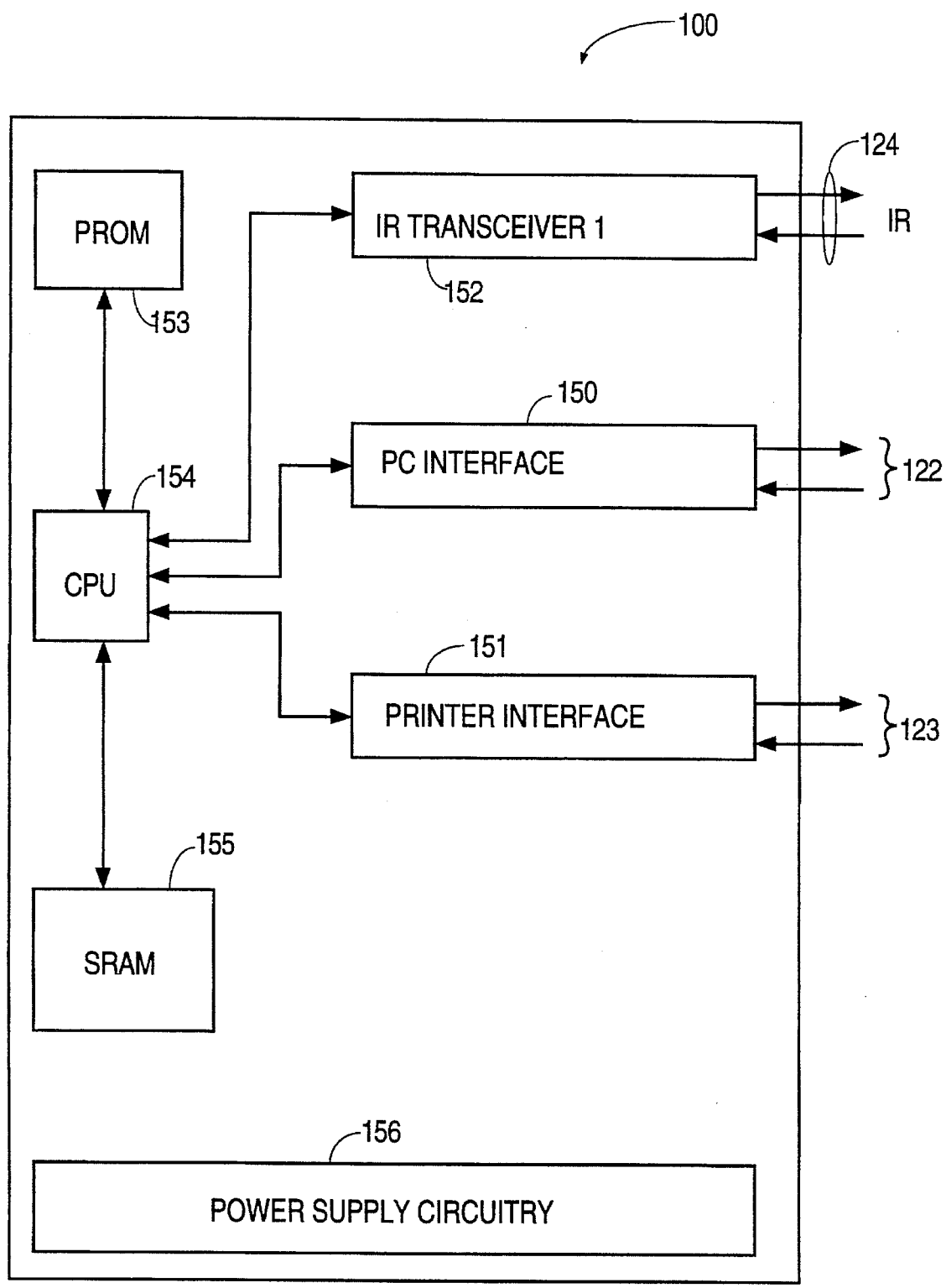
FIG. 2a shows a block diagram of IR interface device 100.

FIG. 2a is a block diagram of IR interface device 100. As shown in FIG. 2a, IR interface device 100 includes a central processor unit (CPU) 154, a non-volatile programmable read-only memory (PROM) 153 and a static random access memory (SRAM) 155. CPU 154 can be implemented by a microprocessor. Data received from host computer 120 (FIG. 1a) over wired link 122 into IR interface device 100 is retransmitted through IR transceiver 152 over IR link 124 to computer 125 (FIG. 1a). IR transceiver 152 has both a transmitter portion and a receiver portion. Data received over IR link 124 is provided to host computer 120 over wired link 122, or to printer 130 over wired link 123. In this embodiment, wired link 122 is provided as a standard RS232C port, hence PC interface 150 includes a voltage level conversion circuit to translate between RS232C voltage levels (on the side of host computer 120) and CMOS voltage levels (on IR interface device 100). In this embodiment, wired link 123 is provided a parallel port at CMOS voltage levels. Power supply circuit 156 allows IR interface device 100 to receive power from either an external DC power source, from an internal battery power supply, or from host computer 120. PROM 153 stores the firmware of IR interface device 100. SRAM 155 provides a buffer memory for storing data to be sent to printer 130.

Figure 3A:
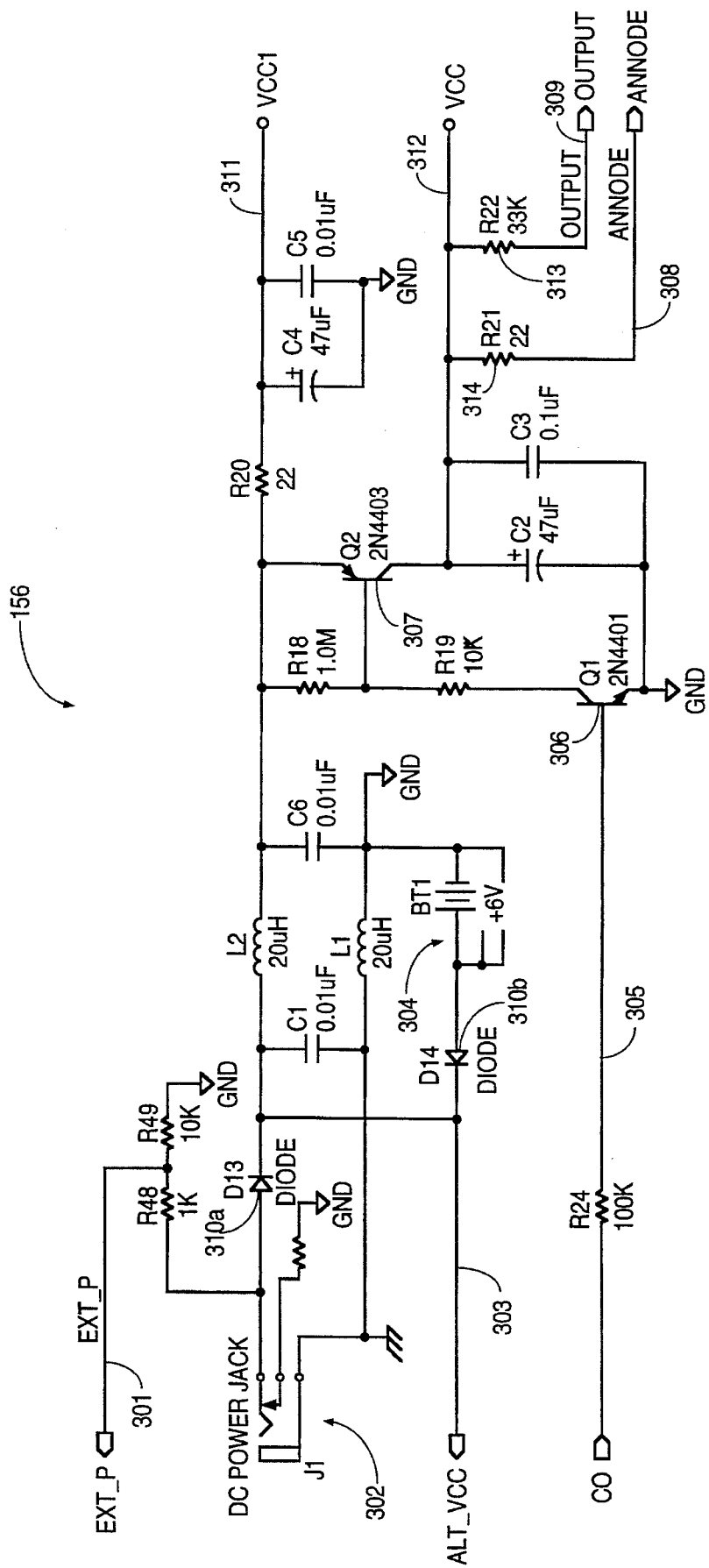
Figure 3B:
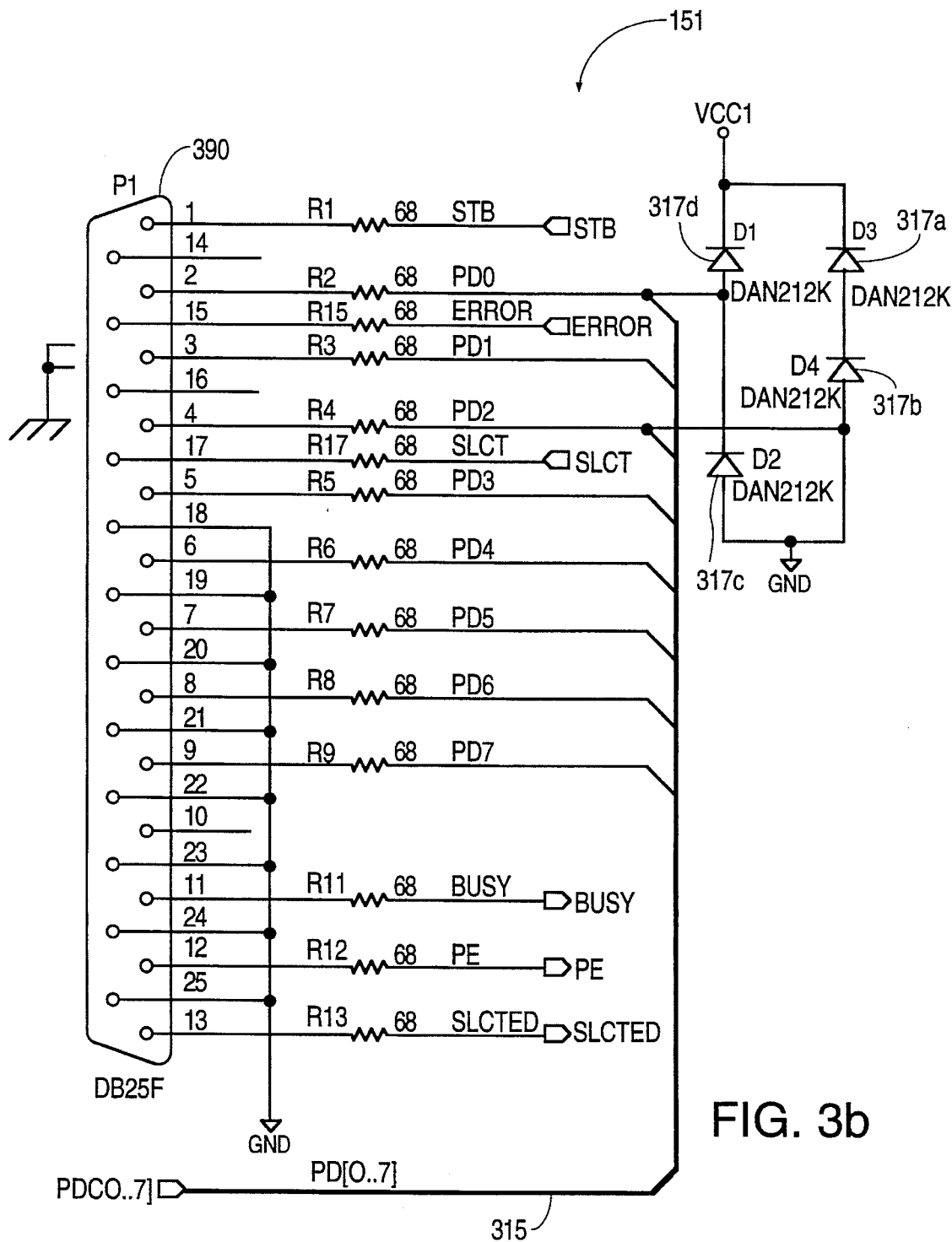
Figures 1, 3C:
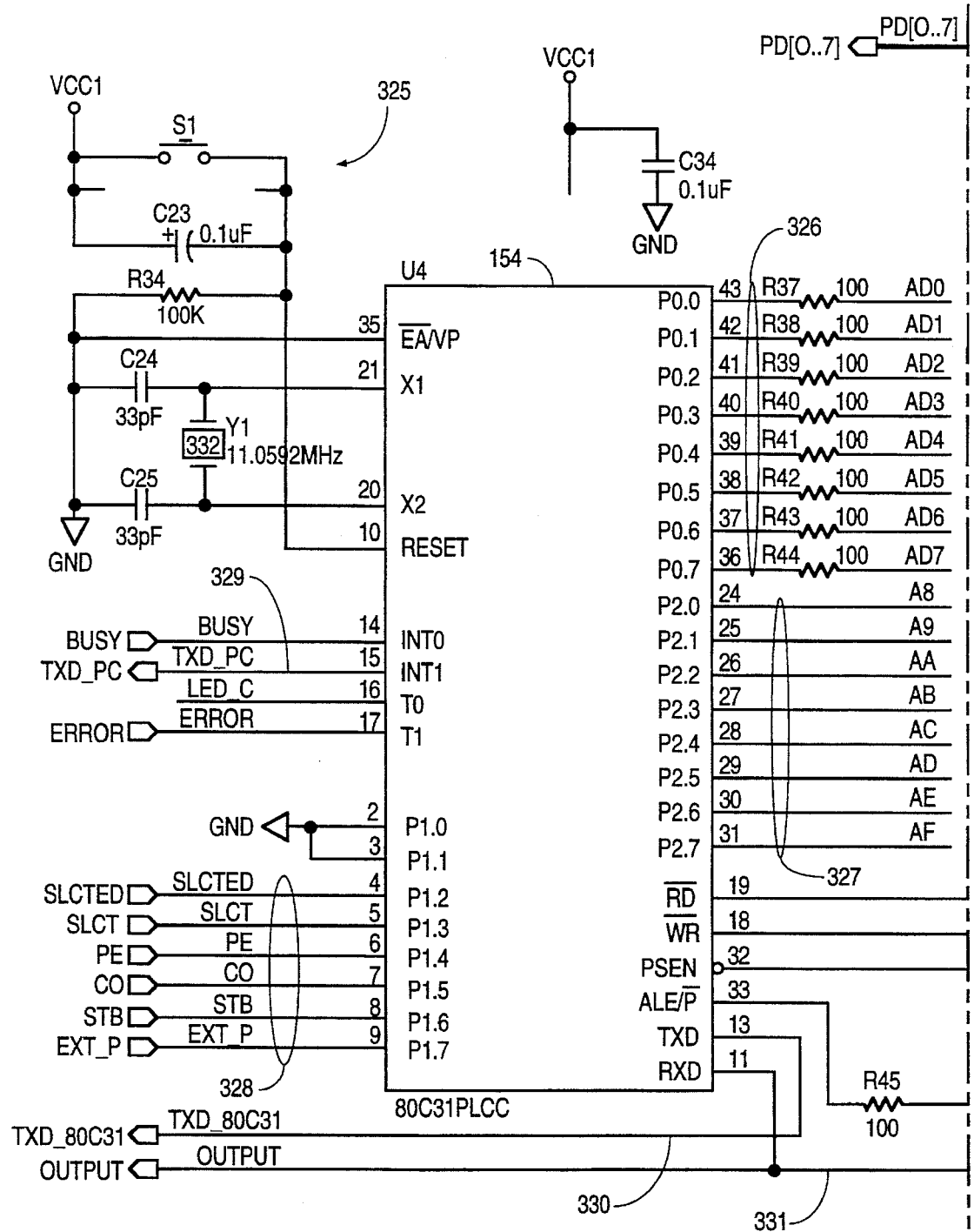
FIG. 3c is a schematic diagram showing FIG. 2a's CPU 154, PROM 153, SRAM 155 and interface circuit 150 between host computer 120 and interface device 100.
Figures 2, 3C:
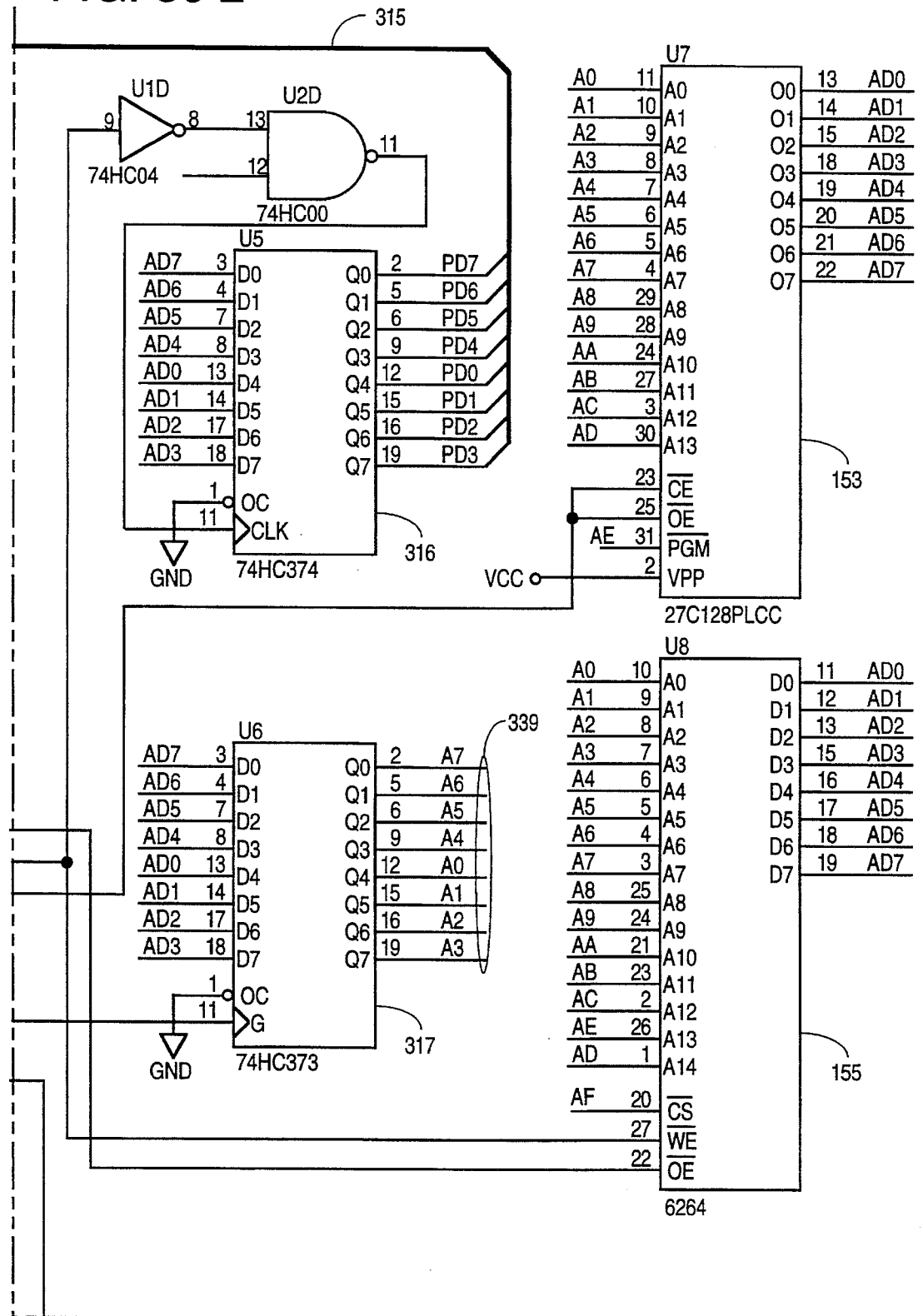
Figures 3, 3C:
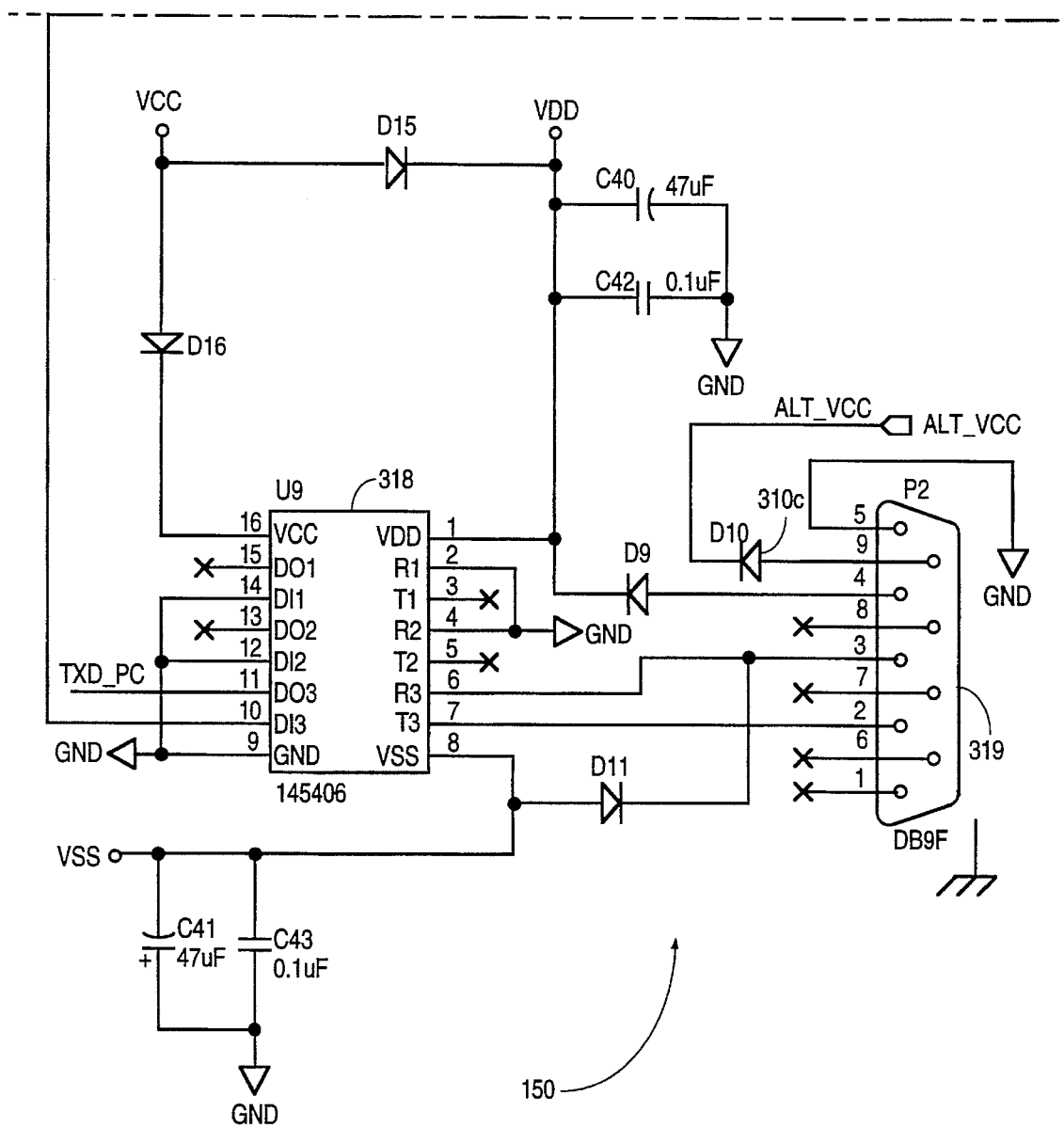

FIG. 3a–3f are schematic diagrams showing in further detail IR interface device 100. FIG. 3a is a schematic circuit of power supply circuit 156. As shown in FIG. 3a, a supply voltage can be provided (i) on lead 303 (from pin 9 of a 9-pin RS232 connector 319 coupled to computer 120 (FIG. 1a); connector 319 is shown in FIG. 3c), (ii) from an external power supply through jack 302, and from (iii) battery 304. Diodes 310a, 310b and 310c (diode 310c is shown in FIG. 3c) are provided to isolate each source of power supply voltage from the other sources of power supply. Lowpass filtering is provided to prevent damage to IR interface device 100 due to sudden surges in the supply voltage. When a supply voltage is provided through jack 302, signal "Ext P" is provided at terminal 301 to indicate that power is received from such an external power supply.

Under normal operation, the active state of a control signal "CO" on lead 305 maintains transistor 306 in a conducting state. As a result, NPN transistor 307 is also in a conducting state, so that the voltages at terminals 311 and 312 are substantially equal at the supply voltage level. The voltage at terminal 312 is supplied to a circuits in interface device 100 which can be shut down to conserve power. If control signal "CO" is in the inactive state, transistor 306 is switched off. As a result, transistor 307 is also switched off, thereby causing a "power down" in the circuitry supplied by terminal 312. In the present embodiment, control signal "CO" is in the inactive state after a period of 6 minutes has elapsed, as measured from the time the last IR signal is received. Control signal "CO" is disabled when interface device 100 is powered by an external power supply (i.e. the control signal "Ext P" is not active).

Resistor 313 is provided to "pull-up" the signal "Output" at terminal 309. Signal "Output" on terminal 309 is an amplified output signal from the IR receiver circuit 320 shown in FIG. 3d. Resistor 314 is a current-limiting resistor to limit the power dissipation in transmitter 350 (FIG. 3e).

FIG. 3b is an interface circuit 151 for the interface between printer 130 and IR interface device 100. As shown in FIG. 3b, the input and output signals of interface circuit 151 includes 6 control signals and an 8-bit data bus 315. The control signals are shown as "STB" ("standby"), "ERROR" ("error"), "SLCT" ("select"), "BUSY" ("busy"), "PE" ("printer enabled") and "SLCTED" ("selected"). The signals "STB", "ERROR", and "SLCT" are input signals to printer 130. The signals "BUSY", "PE" and "SLCTED" are output signal from printer 130. Each of Bus 315's signal lines are protected by a pair of diodes. For example, in FIG. 3b, diodes 317a–317d, prevent the voltages in the corresponding signal lines PD0 and PD2 (i.e. bits 0 and 2 of bus 315) from rising above or falling below the supply voltage and the ground voltage, respectively. In the present embodiment, interface circuit 151 is terminated in a DB-25 connector 390 mounted on the housing (not shown) of IR interface device 100.

FIG. 3c is a schematic diagram showing CPU 154, PROM 153 and SRAM 155, and a serial interface circuit 150. Serial interface circuit 150 is provided to handle signals between host computer 120 and IR interface device 100. CPU 154 can be implemented, for example, by a 80C31 microprocessor available from Intel Corporation, Santa Clara, Calif. In this embodiment, CPU 154 provides three 8-bit input/output (I/O) busses 326, 327 and 328. I/O bus 326 is an 8-bit multiplexed address and data bus, I/O bus 327 is an 8-bit address bus, and I/O bus 328 is a general purpose input and output bus. During the first half of CPU 154's instruction cycle, a 16-bit address is provided by CPU 154 on busses 326 (lower order 8 bits of the 16-bit address) and 327 (higher order 8 bits of the 16-bit address). Since bus 326 is used as an 8-bit data bus during the second half of CPU 154's instruction cycle, the 8 lower order address bits of bus 326 are latched into 8-bit latch 317 prior to the second half of CPU 154's instruction cycle. The 8-bit output value 339 of latch 317 and the eight higher address bits on bus 327 form a 16-bit address to address either PROM 153 or SRAM 155. In this embodiment, PROM 153 is implemented by a 27C128 (128K-bit) EPROM with an 8-bit parallel output value, and SRAM 155 is implemented by a 6264 64K-bit SRAM with an 8-bit parallel output value. Either of the 8-bit output values of SRAM 155 and PROM 153 can be provided on address/data bus 326. The content of address/data bus 326 can be latched into either CPU 154 or 8-bit latch 316. The output value of 8-bit latch 316 is provided on bus 315 for output to printer 130 via printer interface 151 (FIG. 3b). CPU 154 also generates the memory control signals for accessing PROM 153 and SRAM 155 (e.g. the $\overline{WR}$ and the $\overline{RD}$ control signals). As shown in FIG. 3c, CPU 154 generates the six control signals to printer interface 151 discussed above and the control signal "CO" (also shown in FIG. 3a).

Two streams of data are transmitted through IR transceiver 152. In FIG. 3c, these two data streams are labelled "TXD PC" (at terminal 329) and "TXD" (at terminal 330). In addition, a data stream "RXD" (at terminal 331) is received from IR transceiver 152, which can be forwarded to host computer 120 or printer 130. Timing in IR interface device 100 is provided by a 11.0592 Mhz crystal in circuit 325.

FIG. 3c also shows interface circuit 150 to host computer 120. As shown in FIG. 3c, interface circuit 150 includes a voltage level converter 318 and handles input and output signals of a DB-9 9-pin connector 319 mounted on the housing of interface device 100. Voltage level converter 318 can be implemented, for example, by a Motorola 145406 device. In this embodiment, pin 9 in DB-9 connector 319 can be used to provide power to IR interface device 100. A diode 310c is provided to protect pin 9 from other power sources which can be used to power IR interface device 100. In this embodiment, data to be transmitted are received from host computer 120 into IR interface device 100 on pin 3 of the DB-9 connector 319 as "TXD PC" and data to be sent to host computer 120 is provided on pin 2 of DB-9 connector 319.

Figure 3D:
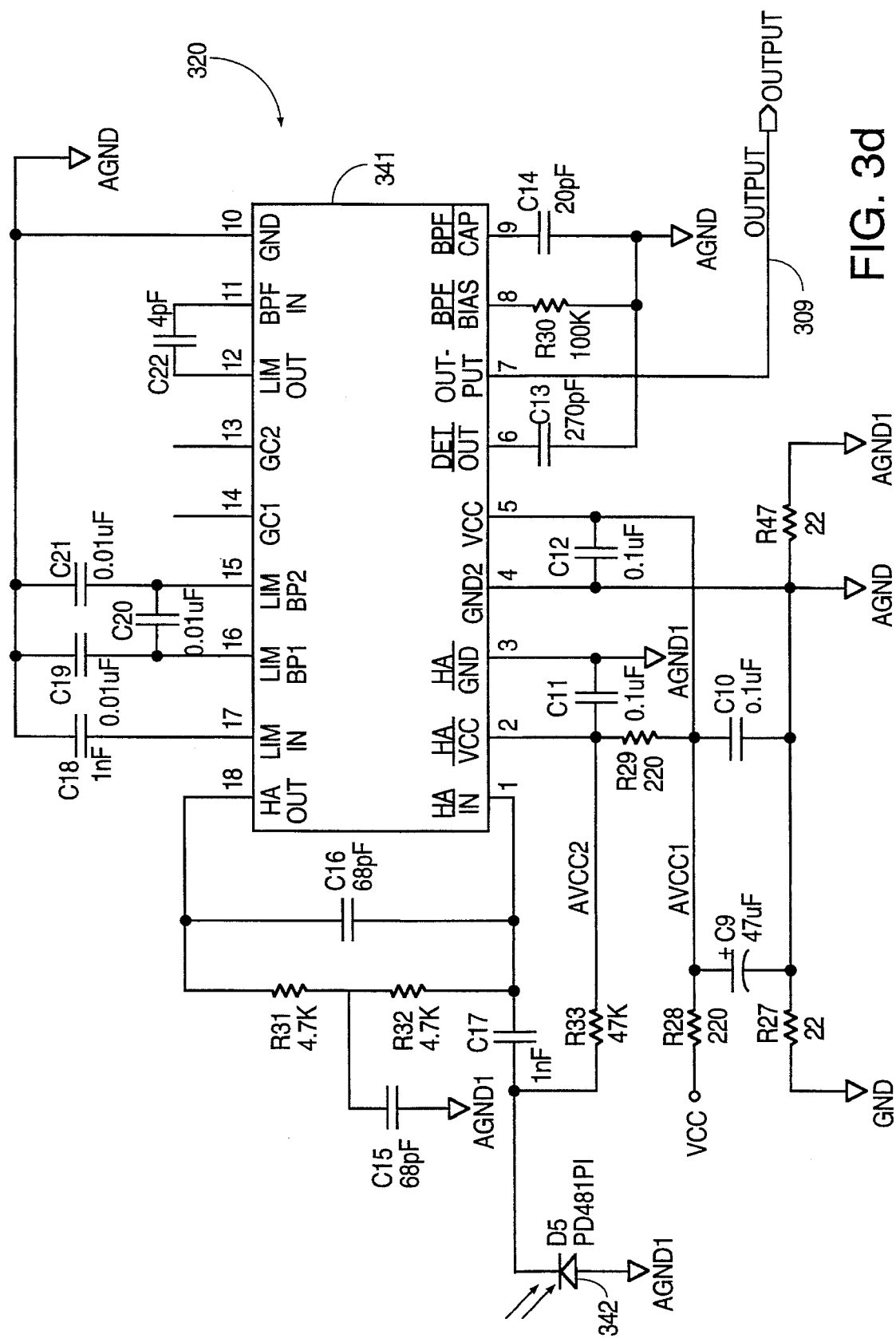
FIG. 3d is a schematic diagram showing the receiver portion 320 of FIG. 2a's IR transceiver 152.
Figure 3E:
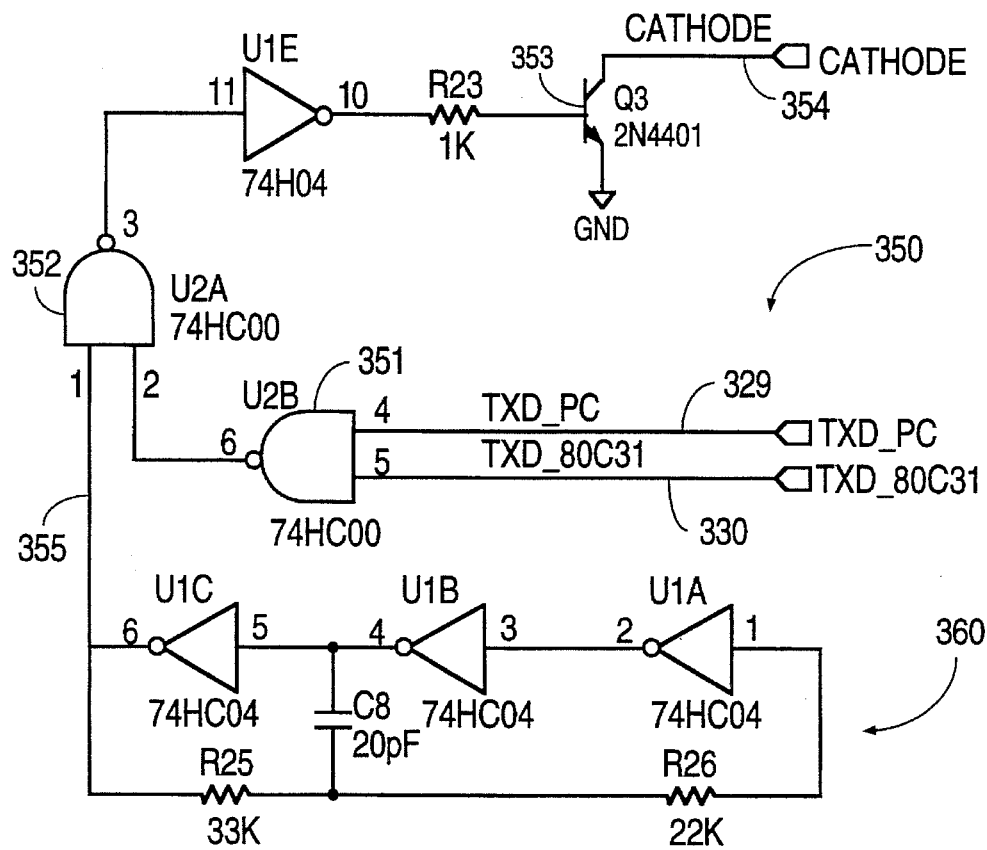
FIG. 3e is a schematic diagram showing the transmitter portion 350 of FIG. 2a's IR transceiver 152.

FIG. 3d shows the receiver portion 320 of IR transceiver 152. In the embodiment shown in FIG. 3d, a PIN photodiode 342, such as PD481PI from Sharp Corporation, Tokyo, Japan, is connected to an amplifier 341 to provide an output signal 331, which indicates whether IR radiation is detected at photodiode 342. In this embodiment, amplifier 341 can be implemented by an IX1614 integrated circuit from the Sharp Corporation. The IX1614 integrated circuit includes an amplifier, a bandpass filter, a detector and a hysteresis comparator. The resistors and capacitors shown in FIG. 3d are provided in accordance with the manufacturer's specification for the IX1614.

Figure 3F:
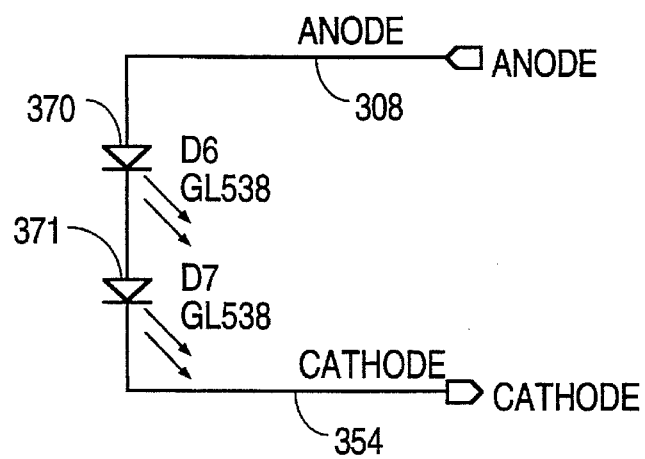
FIG. 3f shows the photodiodes 370 and 371 used in transmitter portion 350 of FIG. 2a's IR transceiver 152.

FIG. 3e shows transmitter portion 350 of IR transceiver 152. As shown in FIG. 3e, a ring-oscillator 360 is provided to generate a subcarrier signal at terminal 355. This subcarrier signal (e.g. 500 KHz) at terminal 355 is used to modulate, in NAND gate 352, the output signal of NAND gate 351, which is one of the signals "TXD PC" and "TXD", received as input signals to NAND gate 351 at terminals 329 and 330, respectively. Signal "TXD PC" and "TXD" are both output signals from CPU 154 (FIG. 3c). Since only one of these two signals can be active at a given time, the output signal of NAND gate 351 is the negated active signal of either "TXD PC" or "TXD". The modulated signal, i.e. the output signal of NAND gate 352, is used to control PNP transistor 353. The current in PNP transistor 353 drives photodiodes 370 and 371 (FIG. 3f). Photodiodes 370 and 371 are connected between collector terminal 354 of transistor 353 and terminal 308 (supply voltage $V_{CC}$) of power supply circuit 156 (FIG. 3a). Photodiodes 370 and 371, which can each be implemented by one or more GL381 infrared light emitting diodes from Sharp Corporation, are shown in FIG. 3f.

Appropriate bypass capacitors, although not specifically discussed above, are provided throughout to protect IR interface device 100.

Figure 1B:
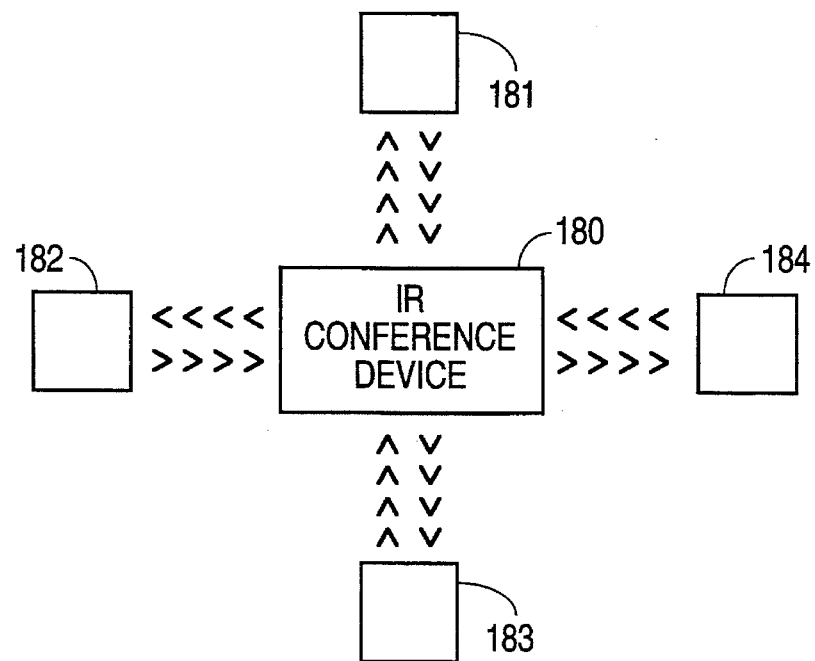
FIG. 1b shows an IR conference device 180 providing a conference data link for up to four conference participants, in accordance with the present invention.

An alternative embodiment of the present invention is shown in FIG. 1b. FIG. 1b shows an IR conference device 180 providing conference data links for up to four conference participants, in accordance with the present invention. As shown in FIG. 1b, four IR-capable devices 181–184, each provided with an IR transceiver, are each positioned opposite a window mounted in the housing of IR conference device 180. In this embodiment, devices 181–184 can be any device with IR communication capability. For example, device 181 can be a laptop computer, device 182 can be a palmtop computer, and device 183 can be a "personal digital assistant" (PDA). Devices 181–184 can each use a different wireless communication protocol, a different baud rate or a different signal modulation scheme. In one application, each of devices 181–184 can send to conference device 180 data which is retransmitted to each of the remaining devices. In this application, conference device 180 communicates with each of devices 181–184 using the device's baud rate, protocol and signal modulation scheme.

In another application, conference device 180 and each of devices 181–184 is provided an application program which allows its files to be accessed by another of devices 181–184 through conference device 180. Alternatively, each of device 181–184 can upload files or data into the memory of conference device 180. The files and data uploaded into conference device 180 can then be downloaded by any of devices 181–184.

Figure 2B:
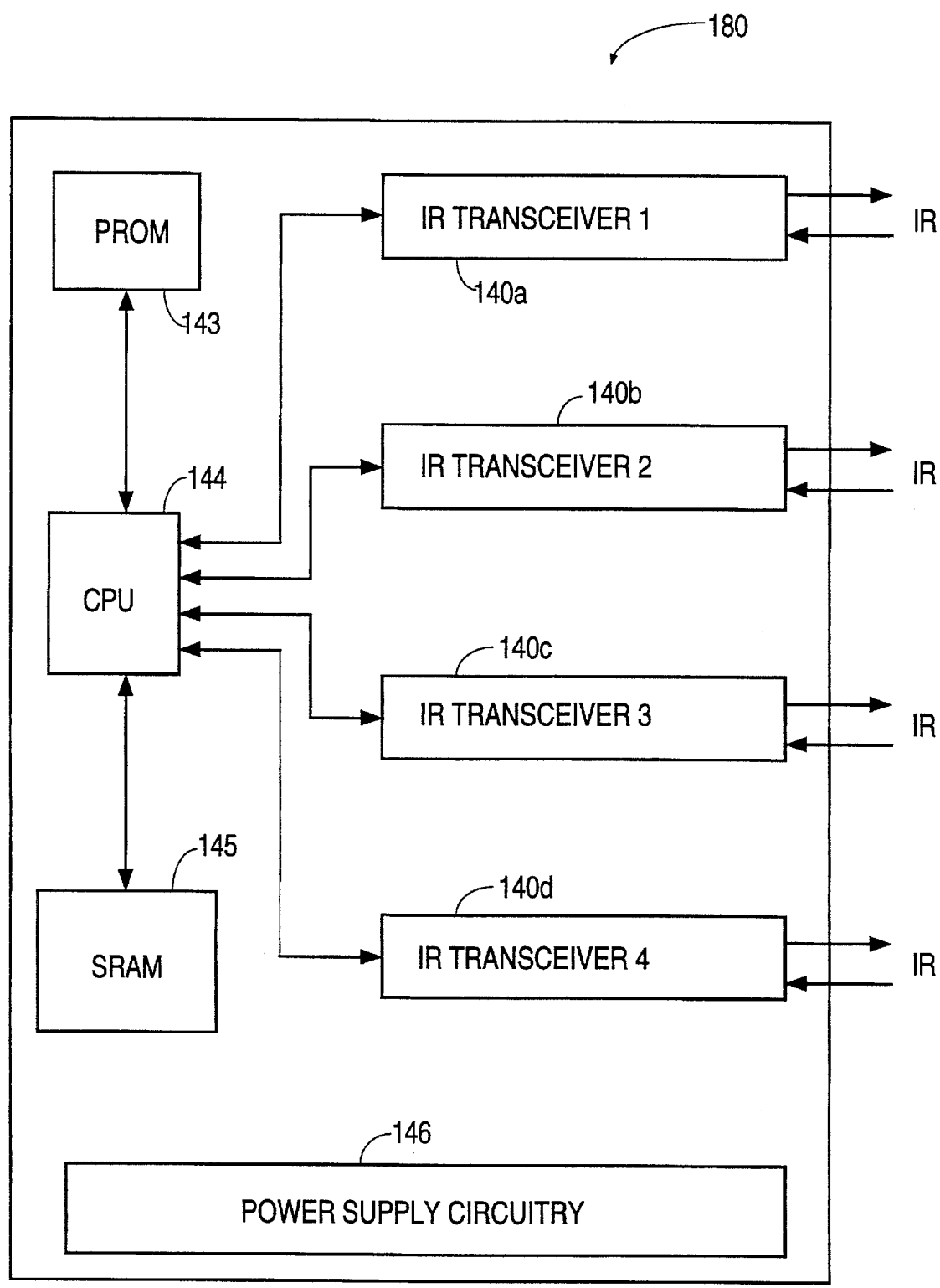
FIG. 2b shows a block diagram of IR conference device 180.

FIG. 2b is a block diagram of conference device 180. As shown in FIG. 2b, IR conference device 180 includes a CPU 144, PROM 143, SRAM 145 and power supply circuit 146. Instead of printer interface 151 and host computer interface 150, as provided in IR interface device 100 of FIG. 2a, conference device 180 has four IR transceivers 140a–140d providing IR communication between IR conference device 180 and each of devices 181–184. Upon receiving a communication request from any one of devices 181–184, CPU 144 configures the corresponding one of IR transceivers 140a–140d to the desired communication protocol, baud rate and signal modulation scheme. To arrive at a negotiated protocol, baud rate and signal modulation scheme, the requesting device repeatedly sends a communication request to IR conference device 180. IR conference device 180 cycles through all possible combinations of baud rate, protocol and signal modulation schemes until the communication request is recognized. Acknowledgment of the agreed upon protocol, baud rate and signal modulation scheme is then sent to the requesting device to establish the IR communication link. Power supply circuit 146 provides power to IR conference device 180.

Figure 4A:
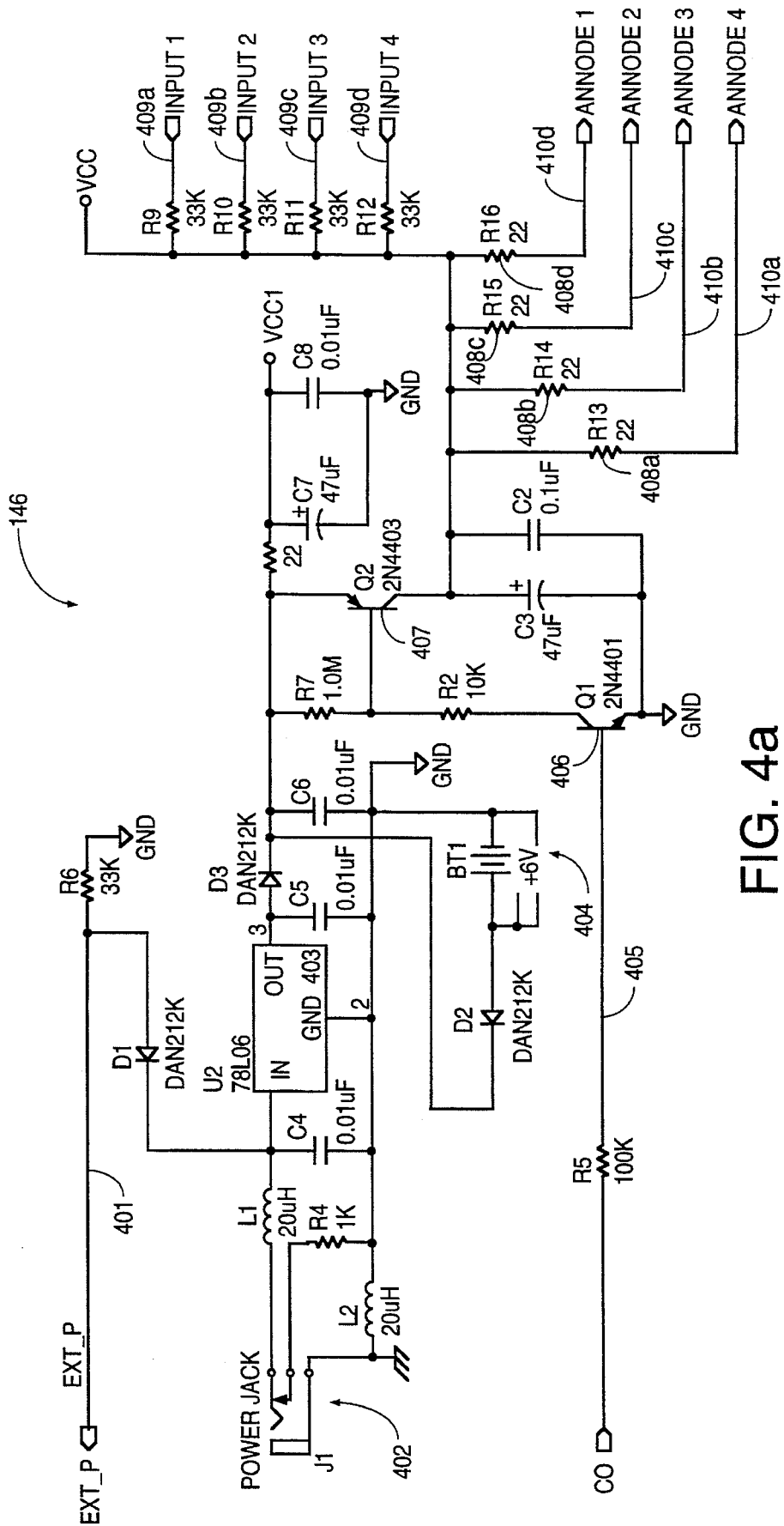
FIG. 4a is a schematic diagram of power supply circuit 146 in IR conference device 180.

FIG. 4a is a schematic diagram of power supply circuit 146 in IR conference device 180. As shown in FIG. 4a, power for IR conference device 180 can be drawn from either an external power supply connected through jack 402, or a battery, which is indicated generally by reference numeral 404. As in power circuit 156 of FIG. 3a, a control signal "CO", which controls transistors 406 and 407, allows a portion of the IR conference device 180 to be temporary shut down to achieve power conservation. FIG. 4a also shows current-limiting resistors 408a–408d connected at terminals 410a–410d between the supply voltage $V_{cc}$ and each of the anodes of the light emitting diodes in IR transceivers 140a–140d (FIG. 4f shows two light emitting diodes 450 and 451 coupled between a terminal 410, which represents any one of terminals 410a–410d, and corresponding cathode terminal 447, which represents any of terminals 447a–447d of FIG. 4e). FIG. 4a also shows pull-up resistors provided to the output terminals 409a–409d of the receiver portions 420a–420d of IR transceivers 140a–140d (FIG. 4c shows a receiver portion 420, which represents any of receiver portions 420a–420d). FIG. 2a shows IR transceivers 140a–140d. Each of output terminals 409a–409d carries an amplified signal received at a corresponding photodiode.

Figures 1, 4B:
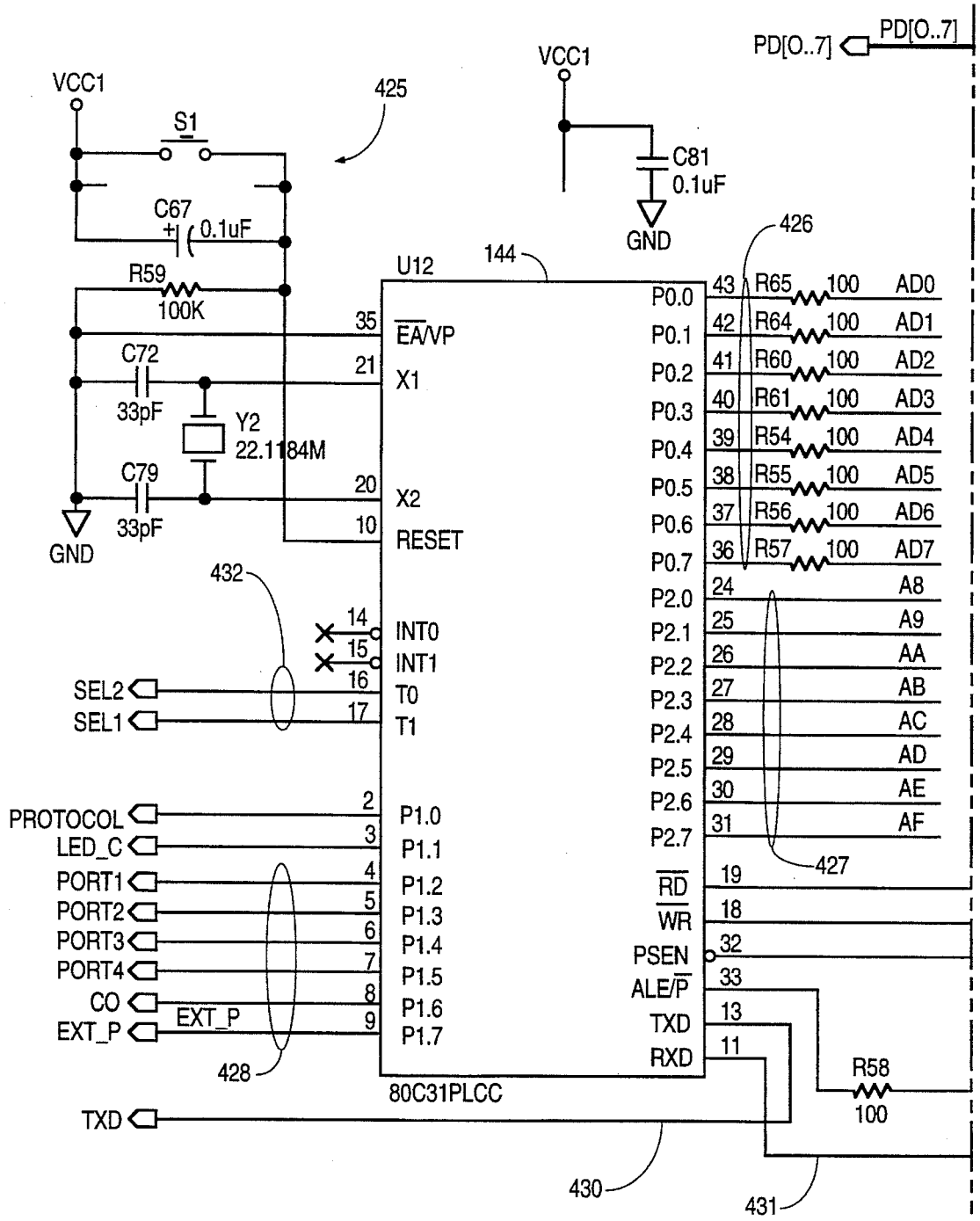
FIG. 4b shows CPU 144, PROM 143, and SRAM 145 of IR conference device 180.
Figures 2, 4B:
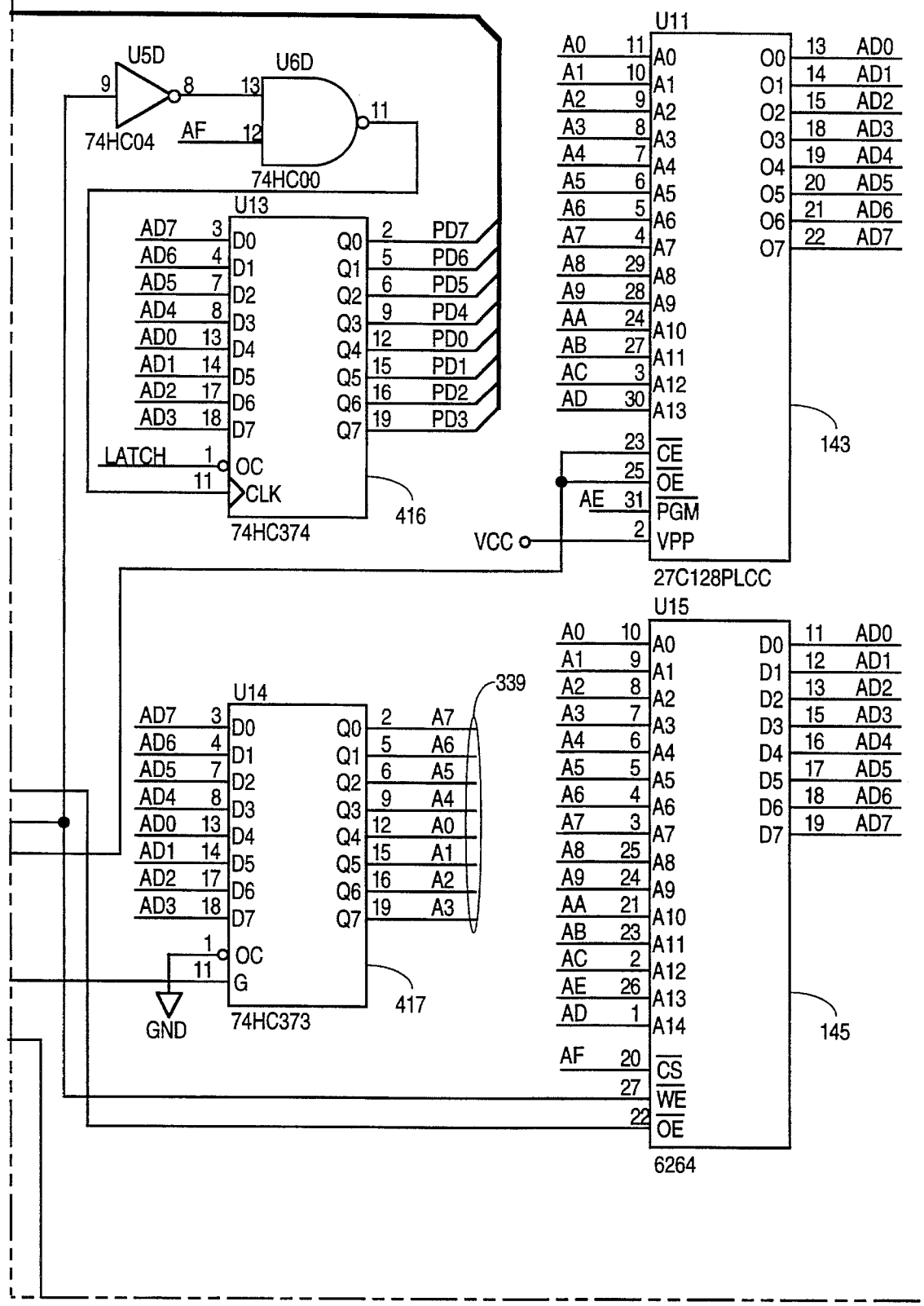
Figures 3, 4B:
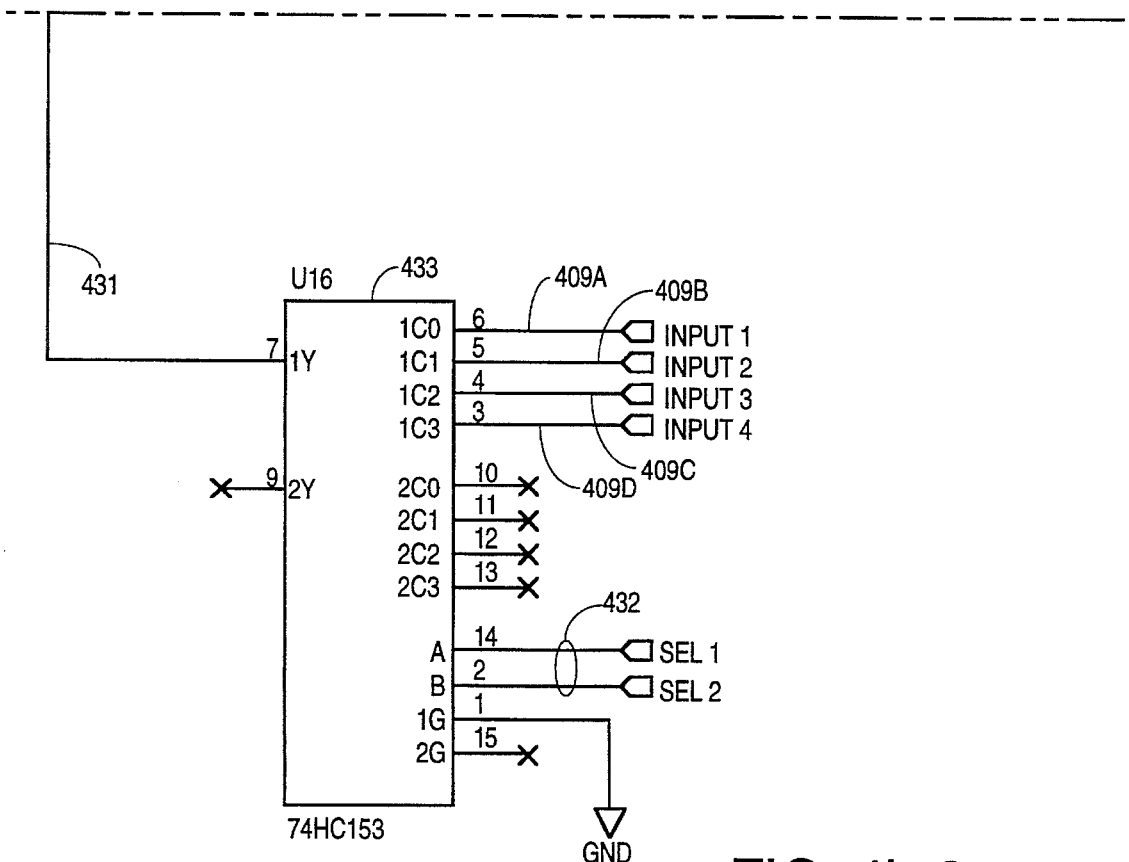
Figure 4C:
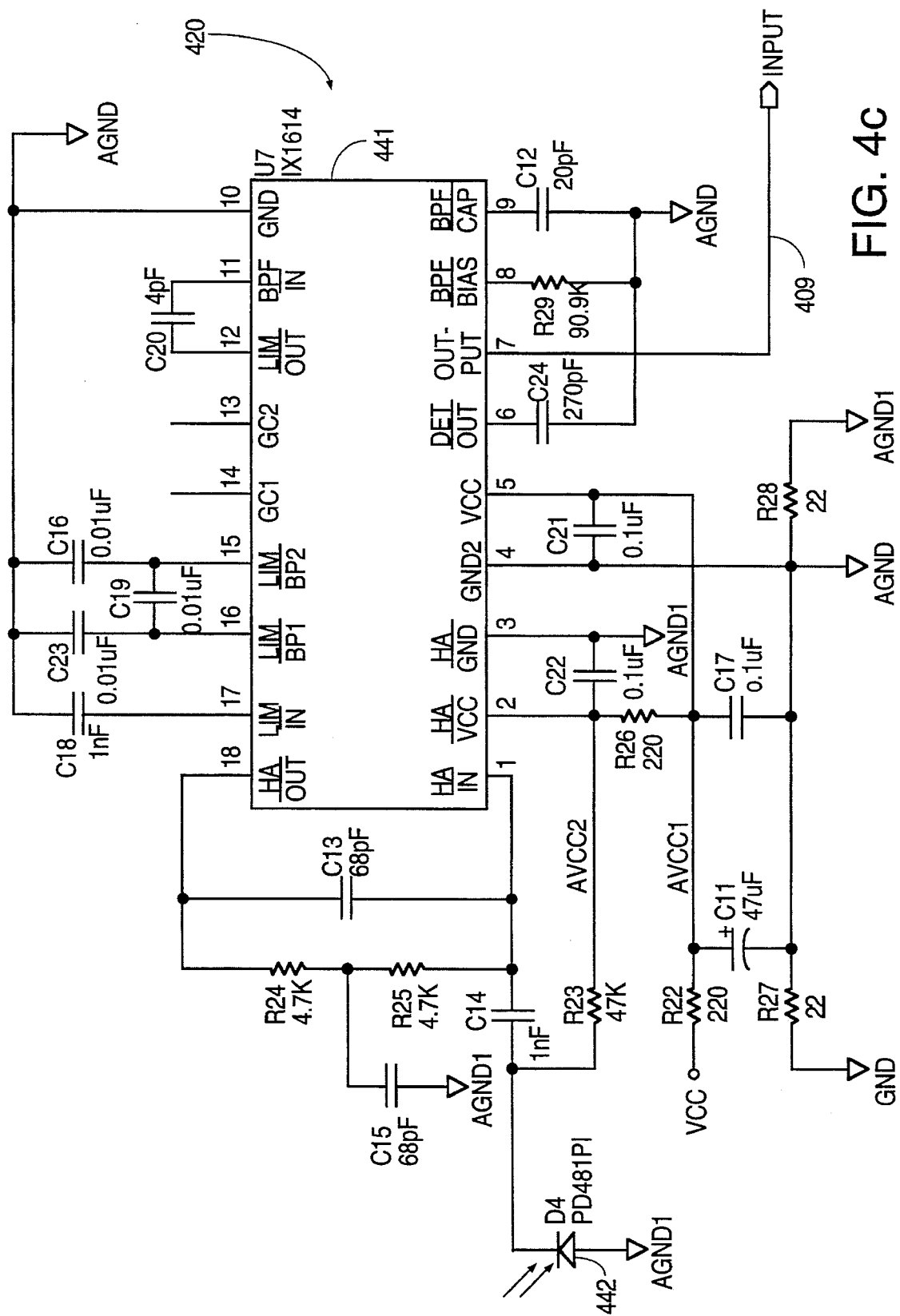
FIG. 4c shows a receiver portion 420 suitable for use as the receiver portion of each of IR transceiver 140a–140d of FIG. 2b.

FIG. 4b shows CPU 144, PROM 143, and SRAM 145 of IR conference device 180. As shown in FIG. 4b, an input signal is received from each of the output terminals 409a–409d of the receiver portions 420a–420d of IR transceivers 140a–140d. Under the control of CPU 144, multiplexer 433 selects, in accordance with the signals of 2-bit bus 432, one of the signals at terminals 409a–409d as the input signal "RXD" of CPU 144. Like CPU 154 discussed above, CPU 144 can also be implemented by a 80C31 microprocessor. CPU 144 provides a serial data output signal at terminal 430, labelled "TXD", to be transmitted by one or more of transmitter portions 430a–430d of IR transceivers 140a–140d.

In this embodiment, CPU 144 provides 3 8-bit input/output (I/O) busses 426, 427 and 428. I/O bus 426 is a 8-bit multiplexed address and data bus, I/O bus 427 is an 8-bit address bus, and I/O bus 428 is a general purpose input and output bus. During the first half of CPU 144's instruction cycle, a 16-bit address is provided by CPU 144 on busses 426 (lower order 8 bits of the 16-bit address) and 427 (higher order 8 bits of the 16-bit address). Since bus 426 is used as an 8-bit data bus during the second half of CPU 144's instruction cycle, the 8 lower order address bits of bus 426 are latched into 8-bit latch 417. The 8-bit output value 339 of latch 417 and the eight address bits on bus 427 form a 16-bit address for addressing either PROM 143 or SRAM 145. In this embodiment, PROM 143 can be implemented, for example, by a 27C128 (128K-bit) EPROM with an 8-bit parallel output value, and SRAM 145 can be implemented, for example, by a 6264 64K-bit SRAM with an 8-bit parallel output value. Either of the 8-bit output values of SRAM 145 and PROM 143 can be provided on address/data bus 426, which can be latched into either CPU 144 or 8-bit latch 416. CPU 144 also generates the control signals, such as the $\overline{WR}$ and the $\overline{RD}$ control signals, for accessing PROM 143 and SRAM 145. Control signals "Port1", "Port2", "Port3", and "Port4" are provided by CPU 144 on bus 428 to select and to enable one of the four IR transceivers 140a–140d for data transmission. The signal for powering down IR conference device 180 is provided by CPU 144 as control signal "CO". Circuit 425, which includes a 22.1184 MHz crystal oscillator, provides a time base for CPU 144.

FIG. 4c shows a receiver portion 420 suitable for use as the receiver portion of any of IR transceivers 140a–140d. In the embodiment shown in FIG. 4c, a PIN photodiode 442, such as PD481PI from Sharp Corporation, Tokyo, Japan, is connected to an amplifier 441 to provide an output signal at terminal 409. The output signal at terminal 409 indicates whether IR radiation is detected at photodiode 442. The output signal on terminal 409 corresponds to any of the input signals received at terminals 409a–409d of multiplexor 433 (FIG. 4b). In this embodiment, amplifier 441 can be implemented, for example, by the IX1614 integrated circuit from the Sharp Corporation discussed in conjunction with FIG. 3d. The characteristics of integrated circuit IX1614 are described above with respect to receiver portion 320 of FIG. 3d.

Figure 4D:
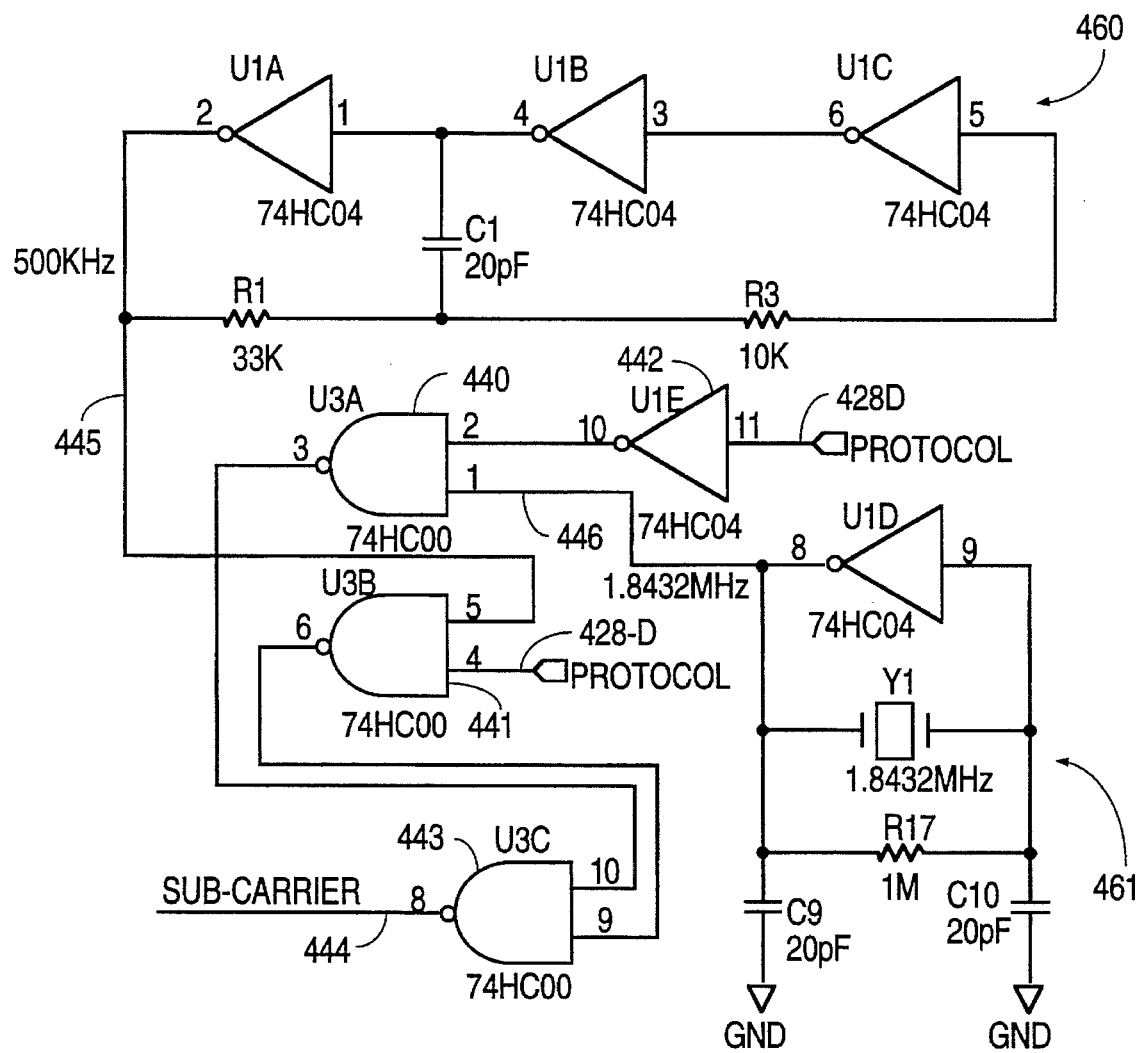
FIG. 4d shows an oscillator circuit for generating a subcarrier signal at terminal 444, which is used in modulating the "TXD" signal provided on terminal 430 (terminal 430 is shown in FIG. 4b).

FIG. 4d shows an oscillator circuit for generating a subcarrier signal at terminal 444, which is used in modulating the "TXD" signal provided on terminal 430 (FIG. 4b). As shown in FIG. 4d, a ring oscillator 460 generates a 500 KHz subcarrier signal at terminal 445. At the same time, crystal oscillator circuit 461, which uses a 1.8432 MHz crystal, also generates a subcarrier signal at terminal 446. CPU 144 provides a control signal "PROTOCOL" at bit 0 (terminal 428-0) to select and to propagate one of the subcarrier signals of terminals 445 and 446. Control signal "PROTOCOL" and its complement are provided as input signals to NAND gates 441 and 440 respectively to disable transmission of one of the subcarrier signals at terminals 445 and 446 to NAND gate 443. The transmitted subcarrier signal appears at terminal 444 as an output signal of NAND gate 443.

Figure 4E:
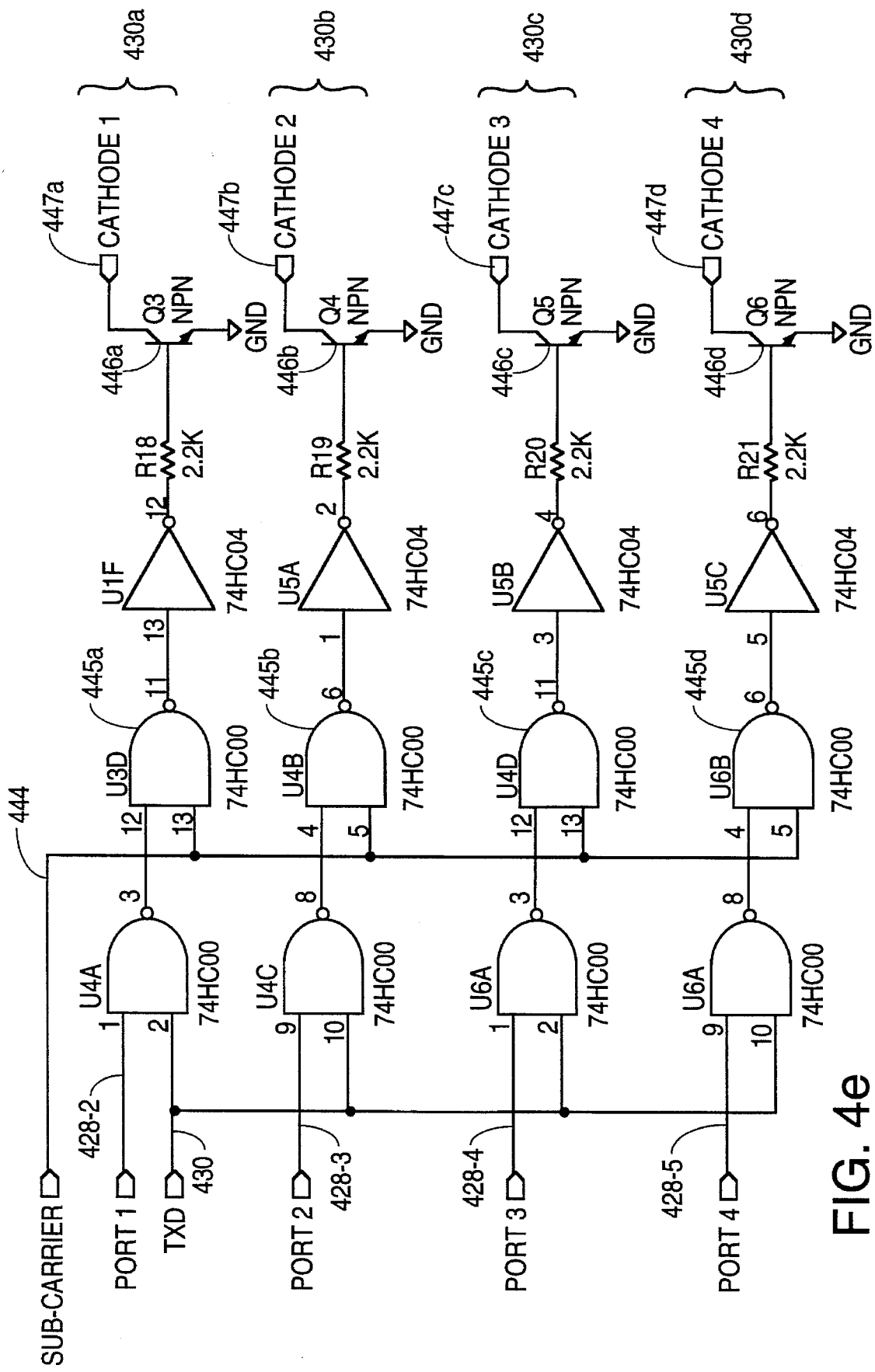
FIG. 4e shows transmitter portions 430a–430d of IR transceivers 140a–140d of FIG. 2b.
Figure 4F:
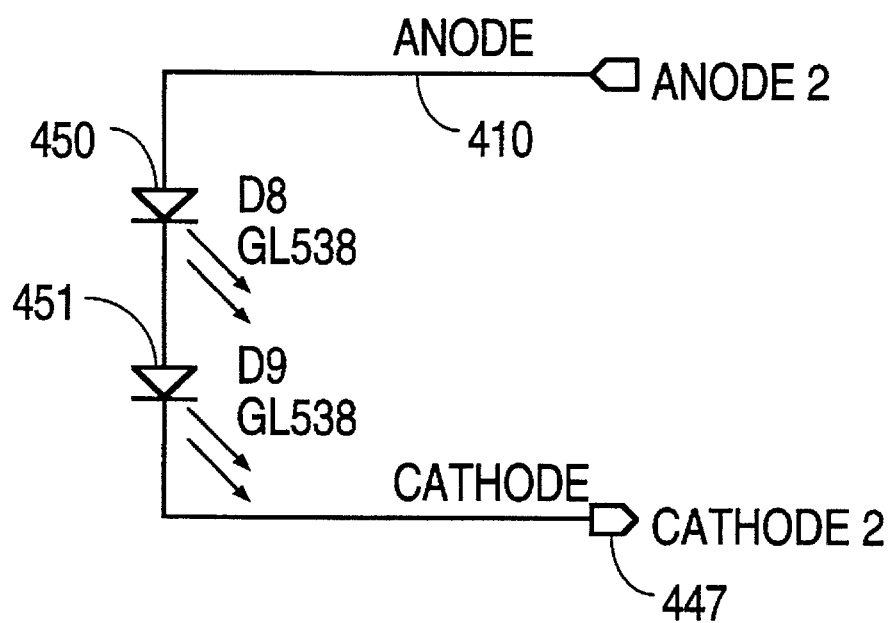
FIG. 4f shows light emitting diodes 450 and 451 used in one of the transmitter portions 430a–430d of IR transceivers 140a–140d FIG. 2b.

FIG. 4e shows transmitter portions 430a–430d of IR transceivers 140a–140d. As shown in FIG. 4e, each of the transmitter portions 430a–430d receives from CPU 144 the "TXD" signal at terminal 430, and one of four enable signals "Port1", "Port2", "Port3" and "Port4" at pin 4 (terminal 428-2), pin 5, (terminal 428-3), pin 6 (terminal 428-4), and pin 7 (terminal 428-5) of CPU 144 respectively. When enabled at one of transmitter portions 430a–430d, the "TXD" signal is modulated at the corresponding one of NAND gates 445a–445d by the subcarrier signal at terminal 444. The modulated signal is then used to control the corresponding one of transistors 446a–446d. Transistors 446a–446d each sink a current flowing through corresponding light emitting diodes (shown in FIG. 4f) of the transmitter portion.

FIG. 4f shows the light emitting diodes 450 and 451, which can be used in any one of the transmitter portions 430a–430d of IR transceivers 140a–140d. The light emitting diodes of each of transmitter portions 430a–430d are connected in series between the corresponding one of current-limiting resistors 408a–408d (FIG. 4a) and the corresponding one of terminals 447a–447d. Terminals 447a–447d are the collector terminals of transistors 446a–446d (FIG. 4e). Light emitting diodes 450 and 451 can each be implemented, for example, by a GL381 infrared light emitting diode from Sharp Corporation.

Figure 5:
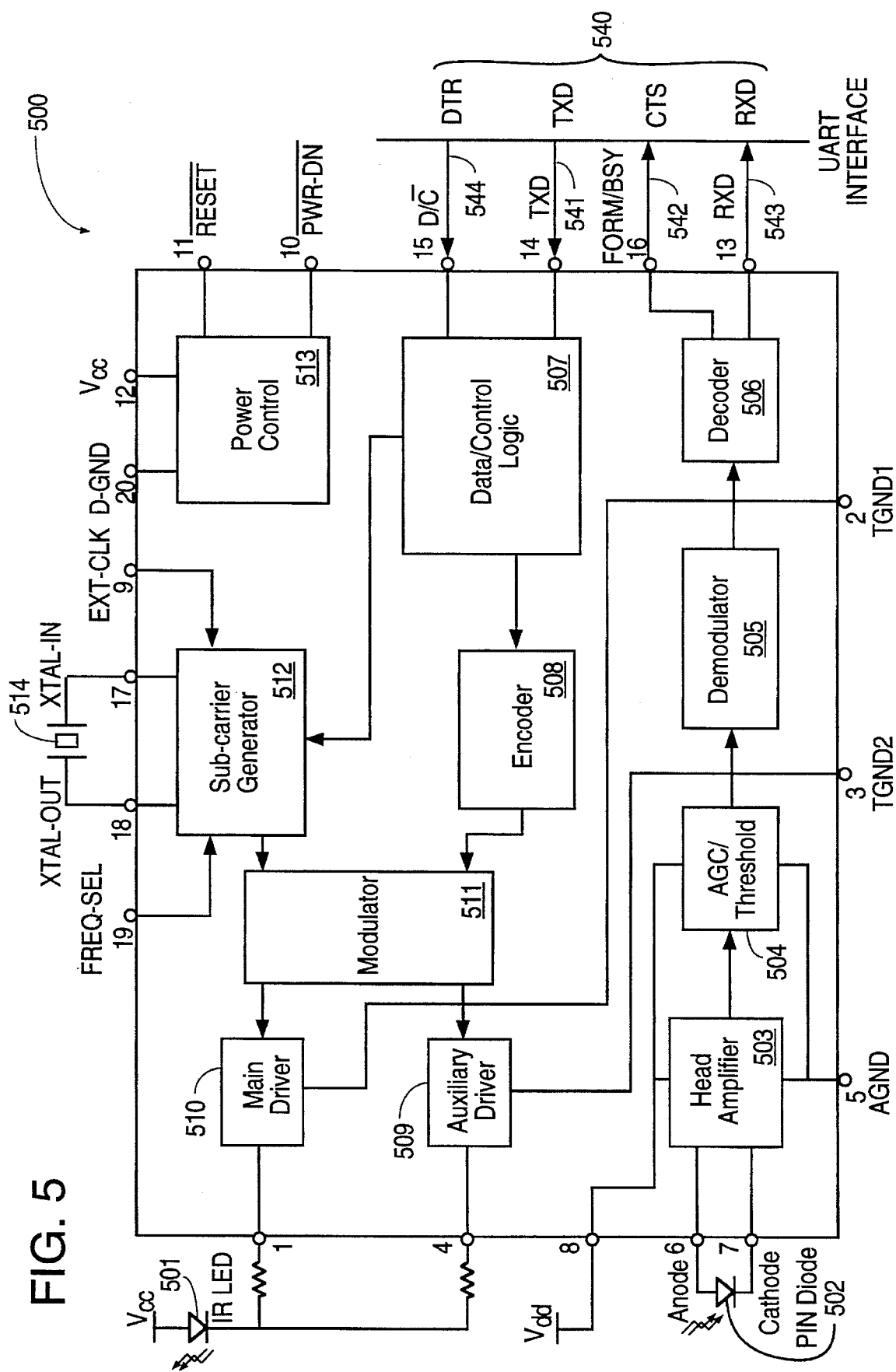
FIG. 5 shows a block diagram of a multistandard infrared transceiver integrated circuit 500 in accordance with the present invention.

To provide IR transmission and reception capabilities to any computer, the present invention provides a multi-standard infrared transceiver integrated circuit with automatic gain control. An example of a multi-standard infra-red transceiver integrated circuit without automatic gain control is the CS8130 from Crystal Semiconductor Corporation, Austin, Tex. FIG. 5 shows a block diagram of a multistandard infrared transceiver integrated circuit 500, which is pin-compatible with the CS8130, but independently designed, in accordance with the present invention.

As shown in FIG. 5, integrated circuit 500 interfaces with a host computer (not shown) over four signal lines of a standard universal asynchronous receiver-transmitter (UART). These signal lines, labelled in FIG. 5 as signal lines 541–544, are data terminal ready ("DTR"), transmit data (TXD), clear to send ("CTS"), and receive data (RXD), which are coupled to pins 13–16 of integrated circuit 500. In one embodiment of the present invention, signal line "DTR" of the UART is coupled to the D/$\overline{C}$ pin of integrated circuit 500. The D/$\overline{C}$ pin is used to indicate whether data for IR transmission or a command to the control logic of integrated circuit 500 is provided on the TXD signal line. In this embodiment, signal line "CTS" is coupled to the FORM/BSY pin of integrated circuit. Pin FORM/BSY is used by integrated circuit 500 to indicate to the host computer (i) when a VCR standard is used, a "full" condition in the receiver FIFO, and (ii) when an IrDA or a Sharp modulation scheme is used, the presence of a 500 KHz subcarrier signal. In that embodiment, integrated circuit 500 supports IrDA standard baud rates between 2.4 Kbps to 115.2 Kbps, Sharp IR communication baud rates between 9.6 Kbps to 38.4 Kbps. Integrated circuit 500 supports, under a VCR standard, an ASK signal modulation scheme using an IR sub-carrier frequencies between 33–455 KHz (inclusive) and, under the Sharp signal modulation scheme, an ASK signal modulation scheme using an IR sub-carrier frequency of 500 KHz. As discussed above, the IrDA signal modulation scheme is a single pulse width modulation scheme.

Integrated circuit 500 provides a $\overline{RESET}$ (reset) pin and a $\overline{PWR-DN}$ (power down) pin for host computer-controlled reset and power-down operations. In addition, in one embodiment, automatic reset is performed by integrated circuit 500 when a break signal is received in the TXD signal from the UART. Further, integrated circuit 500 is provided with a timer which times out after a predetermined time interval of inactivity. At the end of the predetermined time interval, integrated circuit 500 enters a "standby" state and powers down to conserve power. If automatic power down is enabled, the $\overline{\text{PWR-DN}}$ pin is used as an output pin, which can be used as a control signal to power down other circuits. The automatic power down capability is provided in an internal circuit of power control circuit 513. The time base for integrated circuit 500 is provided by either an external clock, or a 3.6864 MHz crystal. An external IR light emitting diode (IR LED) 501 is required to be coupled to integrated circuit 500's transmitter. Similarly, a PIN diode 502 is required to be coupled to integrated circuit 500's receiver.

Data received from the UART is provided to integrated circuit 500 over the TXD terminal 541. Such data is received and queued in a first-in-first-out (FIFO) buffer in Data/Control logic circuit 507. This data is encoded in encoder 508 and modulated in modulator 511 with a subcarrier signal generated by subcarrier signal generator 512. The modulated signal is then provided to IR LED drivers for transmission. Integrated circuit 500 provides constant current main driver 510 and constant current auxiliary driver 509 to drive external IR LED 501. Auxiliary driver 509 is used when the required current in IR LED 501 exceeds a predetermined value. In some applications, power conservation is achieved when main driver 510 alone is sufficient to deliver the required current.

IR signals detected by PIN diode 502 are amplified by pre-amplifier 503. Since adequate amplification depends on both the signal strength and the noise environment, an AGC circuit 504 provides a feedback signal to automatically adjust the gain of pre-amplifier 503. The operation of AGC circuit 504 with respect to immunity from interference by integrated circuit 500's own transmitted signal is described in further detail below. The amplified signal is demodulated in demodulator 505 and decoded in decoder 506 for transmission as the "RXD" signal at terminal 543 to the UART.

Figure 6:
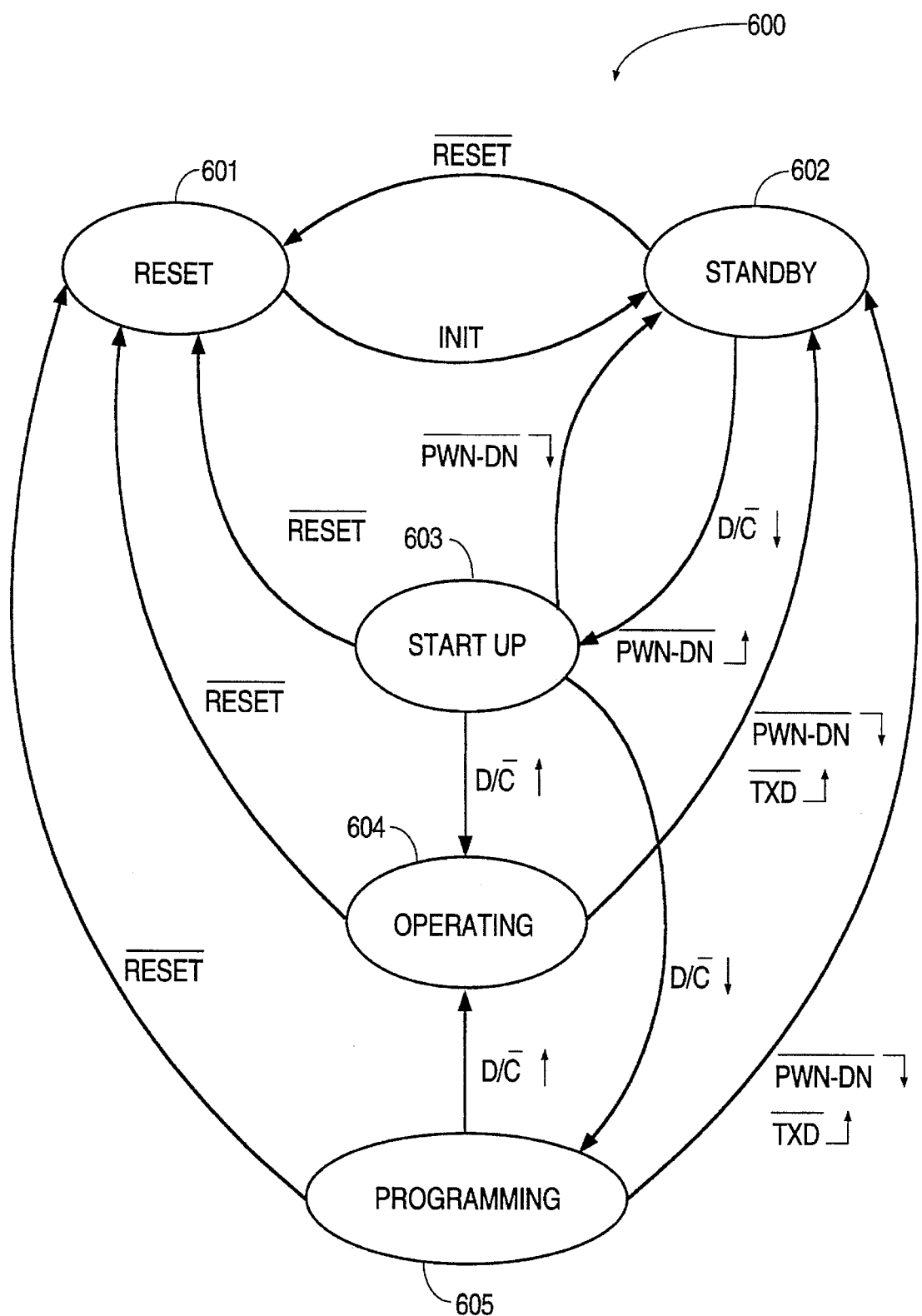
FIG. 6 shows a state machine which represents integrated circuit 500's modes of operation, in accordance with the present invention.

FIG. 6 is a state machine representing integrated circuit 500's modes of operation, in accordance with the present invention. As shown in FIG. 6, integrated circuit 500 has five operating states: (a) reset state 601, (b) standby state 602, (c) start-up state 603, (d) operating state 604, and (e) programming state 605. Reset state 601 is entered upon power up, and can be entered from any state when the $\overline{\text{RESET}}$ signal becomes active, or when a "break" signal is received at the "TXD" input pin 541. The "break" signal is a string of zeroes in the TXD signal over a predetermined duration. Unlike other approaches, such as the approach taken in the CS8130 integrated circuit mentioned above, integrated circuit 500 receives programming data at a predetermined baud rate. In one embodiment, this baud rate is defined to be 9600 baud. In the approaches of the prior art, because programming data can arrive at one of a multiplicity of baud rates, a reset signal must be provided when an application program finds integrated circuit 500 to be in an unknown baud rate. However, with a fixed predetermined programming baud rate, integrated circuit 500 can always be reset from the TXD pin 541. Consequently, a reset pin is unnecessary in integrated circuit 500, although, in this embodiment, a reset pin is provided as an option available to a user of integrated circuit 500.

Upon entering reset state 601, all latches, flip-flops and registers of integrated circuit 500 are initialized to predetermined default values. In addition, sub-carrier generator 512, modulator 511, demodulator 505, drivers 509 and 510 and head amplifier 503 are disabled. Upon completion of this initialization step, integrated circuit 500 enters standby state 602. In standby state 602, because sub-carrier generator 512, modulator 511, demodulator 505, drivers 509 and 510 and pre-amplifier 503 remain disabled, minimum power is consumed.

Standby state 602 is exited and start-up state 603 is entered, when either the D/$\overline{\text{C}}$ (data/command) signal becomes active (a rising edge), or the $\overline{\text{PWR-DN}}$ signal becomes inactive. Standby state 602 is reentered from any of start-up state 603, operating state 604, and programming state 605, when either the $\overline{\text{PWR-DN}}$ signal becomes inactive, or a "break" signal is received on TXD pin 541.

Upon entering start-up state 603, sub-carrier generator 512 is initiated. When the operation of sub-carrier generator 512 is stabilized, depending upon the state of the D/$\overline{\text{C}}$ signal, either operating state 604 or programming state 605 is entered. If D/$\overline{\text{C}}$ is active, operating state 604 is entered; otherwise, programming state 605 is entered. From programming state 605, operating state 604 is entered when the D/$\overline{\text{C}}$ signal becomes active.

Figure 7A:
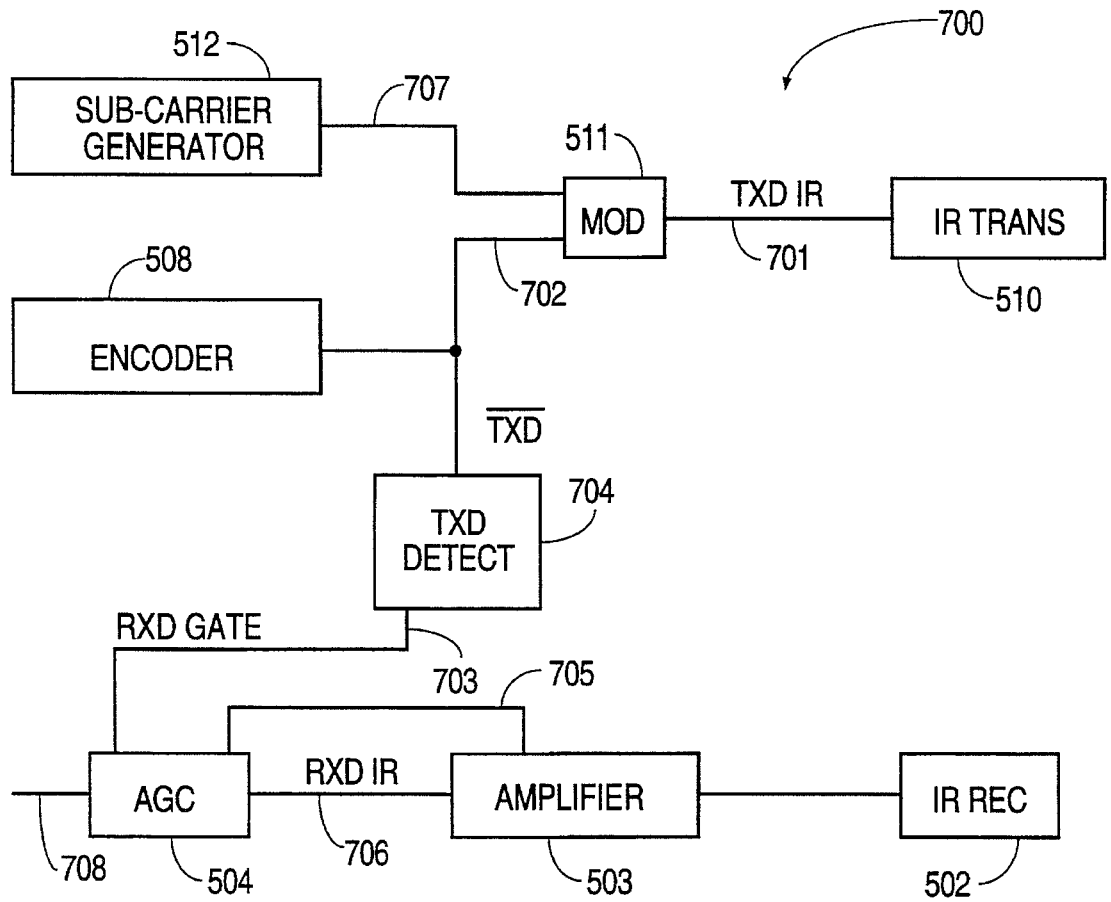
FIG. 7a is a block diagram showing a circuit 700 including an "rxdgate" signal generated to prevent reflections from the transmitted IR signal from interfering with an automatic gain circuit.

To prevent reflections from the transmitted signal to interfere with the operation of the automatic gain circuit (AGC), the present invention provides a disable signal "rxdgate" to disable the AGC for a period of time equal to the sum of the duration of the transmitted signal and an adjustable delay value. FIG. 7a is a block diagram showing a circuit 700 including an "rxdgate" signal generated to prevent reflections of the transmitted IR signal from interfering with an automatic gain circuit. As shown in FIG. 7a, subcarrier generator 512 provides at terminal 707 a subcarrier signal which is used by modulator 511 to modulate the output signal $\overline{\text{TXD}}$ of encoder 508. The modulated signal "txdir" is provided to IR transmitter 510 for transmission. At the receiver side, PIN diode 502 receives IR radiation which is amplified by amplifier 503 to provide an output signal "rxdir". The strength of "rxdir" is detected by AGC 504, which provides an output signal at terminal 705 to adjust the gain of amplifier 503.

Figure 7B:
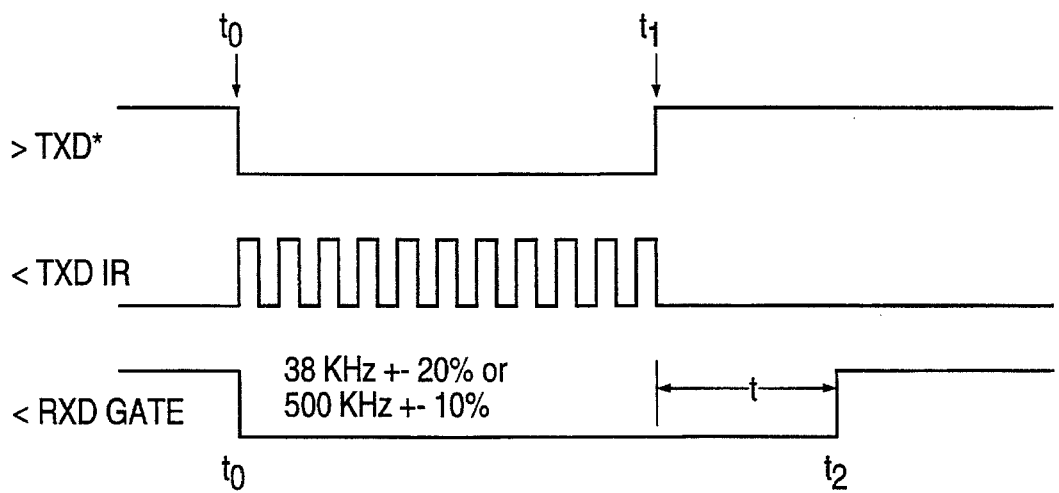

A detector circuit 704 detects the active phase of signal $\overline{\text{TXD}}$ and provides an output signal "rxdgate". Output signal "rxdgate" is illustrated in FIG. 7b. FIG. 7b is a signal timing diagram showing the relationship between integrated circuit 500's own transmitted IR signal "txdir" and the "rxdgate" signal of FIG. 7a. As shown in FIG. 7b, between times $t_0$ and $t_1$, signal $\overline{\text{TXD}}$ becomes active, such that the output signal "txdir" of modulator 511 at terminal 701 includes a train of pulses (under "ASK" modulation, as used in the VCR standard and the Sharp modulation scheme) between times $t_0$ and $t_1$. The output signal "rxdgate" of $\overline{\text{TXD}}$ detector circuit 704, at terminal 703, becomes inactive during the period $t_0$ and $t_2$ to disable AGC 504. The time period between $t_1$ and $t_2$ is an adjustable time period to ensure that the reflected images of integrated circuit 500's own transmitted IR signal does not interfere with the AGC operation. AGC 504 is disabled during the active phase of signal "rxdgate". Although FIG. 7b illustrates the present invention using as examples the VCR standard and the Sharp signal modulation scheme, the present invention is equally applicable when operating under an IrDA signal modulation scheme.

The input signals of integrated circuit 500 is typically at CMOS voltage levels. However, a typical output port under the RS232C standard has a larger voltage range (e.g. −12 V to 12 V) than the CMOS voltage levels of integrated circuit 500. The present invention provides a power scheme, which achieves both a method of voltage level conversion without the use of a voltage level conversion integrated circuit, and a method to power integrated circuit 500 from the signal output lines of the RS232C port.

To achieve a reliable communication over a long distance, IR LED 501 (or, as another example, IR LED 817 of FIG. 8) must be provided sufficient current to achieve the necessary signal strength to compensate for attenuation over the long distance. In the present embodiment, such a current is estimated to have a peak value of approximately 120 mA, with an average current of approximately 20 mA, taking into consideration both active and inactive periods of signal transmission. However, the instantaneous current which can be drawn from a signal line of an RS232 port is no more than 10 mA. Thus, it is seemingly impossible to drive IR LED 501 (or IR LED 817) of this embodiment from a signal line of an RS232 port, without an external power source. Further, not only is the instantaneous current of IR LED needs to be satisfied, such a current must be sustainable in a continuous manner to ensure continuous signal transmission at sufficient signal strength.

Figure 8A:
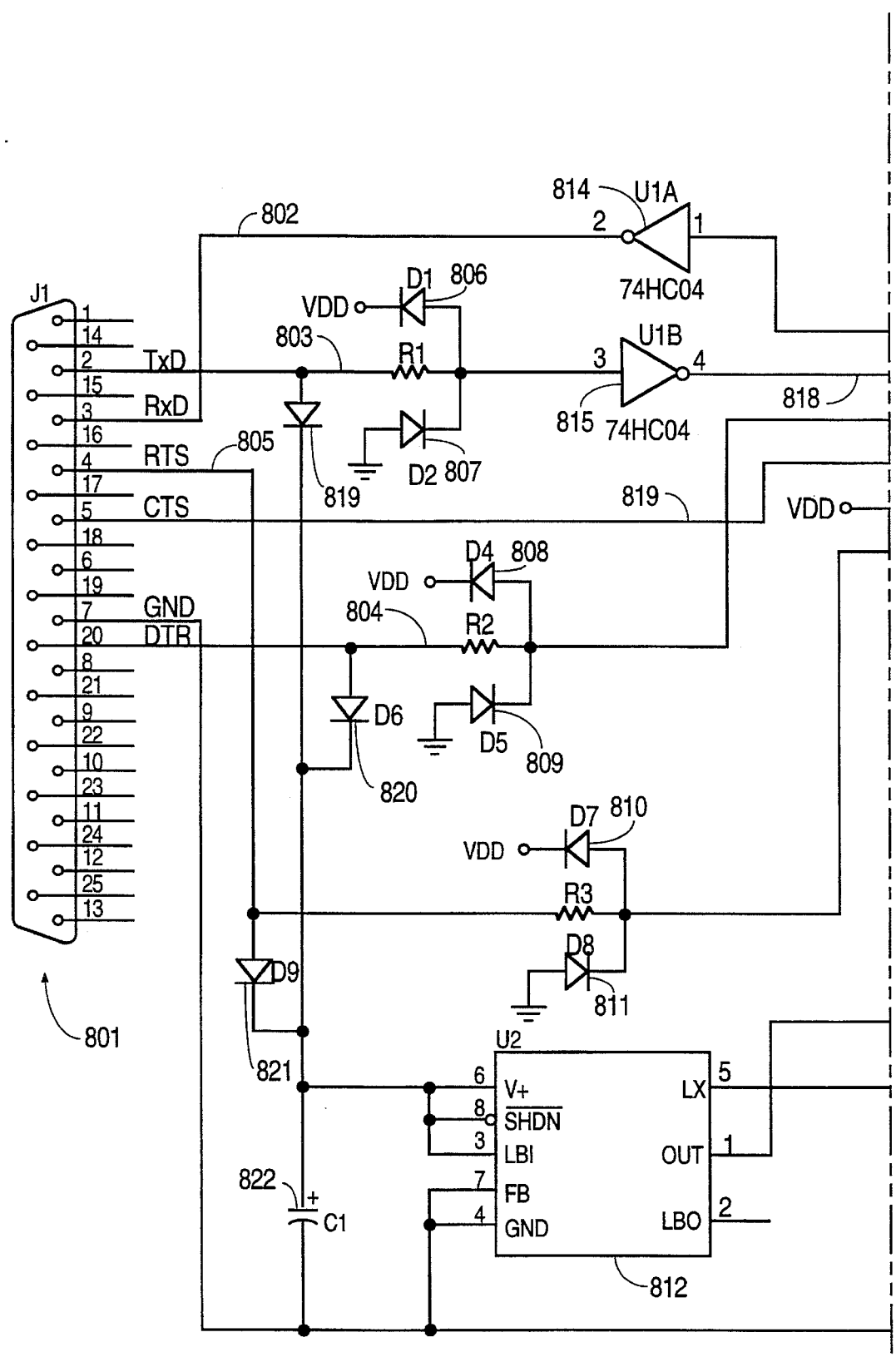
FIG. 8 illustrates the power scheme of the present invention, which provides both voltage level conversion between CMOS voltage levels and RS232C voltage levels, and a power supply for integrated circuit 500 and light emitting diodes 816 and 817.
Figure 8B:
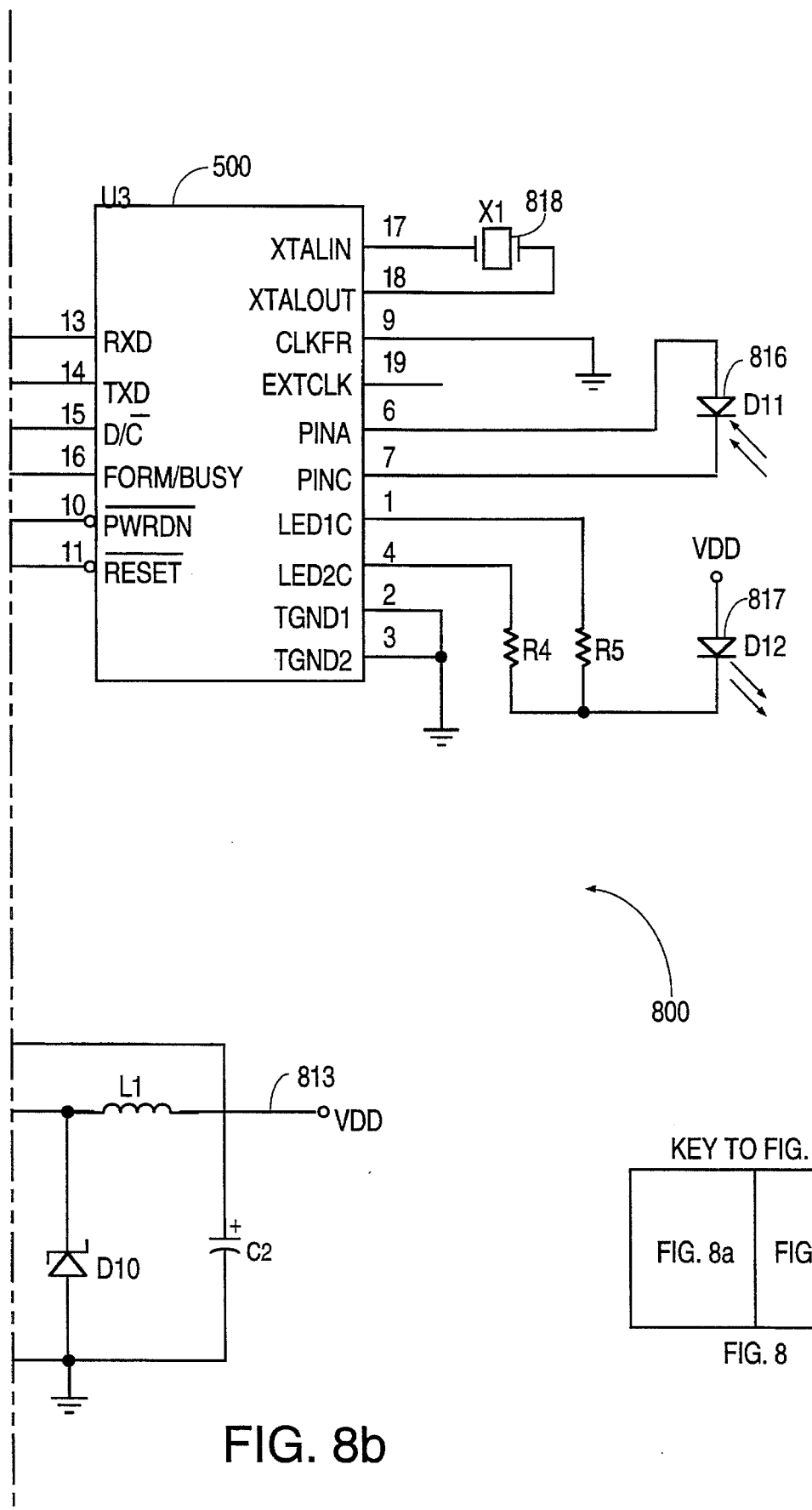

FIG. 8 illustrates the power scheme of a circuit 800, which achieves both voltage level conversion between CMOS voltage levels and RS232C voltage levels, and a power supply scheme for integrated circuit 500 and IR LED 817, in accordance with the present invention. As shown in FIG. 8, connector 801 represents a typical RS232C port of a host computer (not shown). The output signals of the host computer are "TXD", "RTS" and "DTR" at pins 2, 4 and 20 of connector 801, respectively. In circuit 800, output signals "TXD", "DTR" and "RTS" are provided at terminals 803, 804 and 805, respectively. Connector 801 also provides, at pin 7, a ground voltage reference. This ground voltage reference is used as the common ground reference for circuit 800. Diodes 819, 820 and 821 are each provided between a capacitor 822 and one of the output signals at terminals 803–805. Whenever any of the output signals at terminals 803–805 are at a high voltage level (e.g. 12 V), capacitor 822 is charged towards the high voltage level.

The voltage across capacitor 822 is used by a step-down voltage converter 812 to provide a CMOS level supply voltage $V_{DD}$ at terminal 813, which is coupled to the power supply pin of integrated circuit 500 and inverters 814 and 815. Inverters 814 and 815 are provided here to invert the polarities of signals "TXD" and "RXD" at terminals 818 and 802. The polarities of such signals are established by convention in integrated circuit 500 and connector 801. In one embodiment, step-down voltage converter 812 is implemented by a MAX639 step-down voltage regulator, available from Maxim Integrated Products, Santa Clara, Calif. The number of output signals at connector 801 necessary to power the integrated circuits and other electronic components of circuit 800 depends on both the duty cycle of the output signals and the total power consumption of the integrated circuits and the electronic components of circuit 800. In this embodiment, the signals "DTR" and "RTS" are normally at 12 V, and it is estimated that IR LED 817, which draws the most power in circuit 800, has a duty cycle of approximately 20%.

Voltage level conversion of the input signals of integrated circuit 500 is accomplished by limiting each input signal to integrated circuit 500 between the supply voltage $V_{DD}$ generated by step-down voltage converter 812 and common ground. As shown in FIG. 8, the signal at terminal 803 is limited between $V_{DD}$ and ground by diodes 806 and 807 respectively. Diodes 808–811 perform similar functions for the signals at terminals 804 and 805. In each of signal lines 803–805, a serial resistor can be added to limit the current through diodes 806, 808 and 810 to prevent damage to integrated circuit 500 due to a rise in the supply voltage $V_{DD}$. As a device coupled to connector 801 operating under RS232C voltage levels can accept CMOS level input signals, signals "RXD" and "CTS" are connected to pins 3 and 5 of connector 801 without voltage level conversion.

The same voltage level conversion scheme can be applied to a connection between, for example, a desktop computer and a palmtop computer, which typically does not provide for an RS232C high voltage levels because of the overriding objective of power conservation in such a handheld device. In the prior art, such a voltage level conversion is provided by a cable which includes a voltage level conversion integrated circuit (e.g. the Motorola 145406) powered by a signal pin in the RS232C port of the desktop computer, an external power source, or by a signal pin in the serial port driven by the palmtop computer. The present invention eliminates the need of an integrated circuit, thereby eliminating the need for an external power source or, alternatively, avoiding an undesirable power drain from the precious battery power of the palmtop computer. The voltage level conversion scheme of the present invention is illustrated by FIG. 9.

Figure 9:
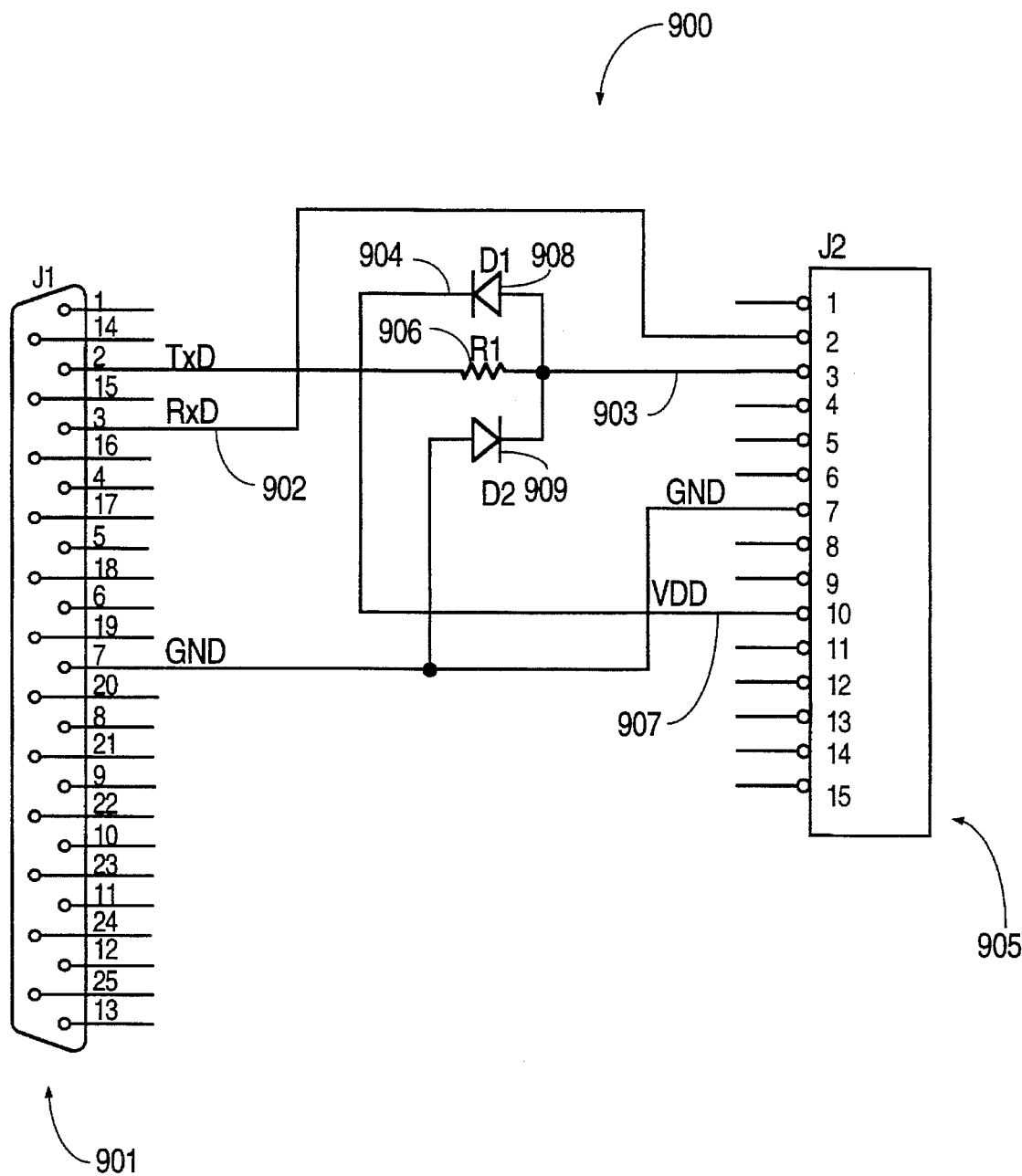
FIG. 9 shows a voltage level conversion scheme for connecting a desktop computer with a RS232C-type port 901 to a palmtop computer with a CMOS level port 905, without the use of a voltage level conversion integrated circuit.

FIG. 9 shows a level conversion scheme for connecting a desktop computer with a RS232C-type port 901 to a palmtop computer with a CMOS level port 905. The circuit 900 can be implemented in a cable having connectors 901 on one end and connector 905 on the other end. Connector 901 represents a connection an RS232C port of desktop computer, which provides an output signal "TXD" at RS232C voltage levels at pin 2. Connector 905 represents a port of a palmtop computer, such as a Sharp Wizard, from Sharp Corporation, which provides CMOS voltage level output signals. At pin 10 of connector 901 (terminal 907) is the supply voltage $V_{DD}$ of the palmtop computer. Pins 7 of connectors 901 and 905 are coupled to the ground reference voltage of both the desktop computer and the palmtop computer. As shown in FIG. 9, diode 908 limits the voltage at terminal 903 to the supply voltage $V_{DD}$ of the palm top computer. Likewise, the diode 909 limits the voltage at terminal 903 to the common ground voltage of the desktop computer and the palmtop computer. A resistor 906 can be provided to limit the currents in diodes 908 and 909. As explained above, the CMOS voltage levels in the output signal "RXD" of the palmtop computer at terminal 902 are acceptable by the RS232C port of the desktop computer.

Another embodiment of the present invention provides two modular interface devices for providing IR capability to an electronic device with a serial interface, e.g. a portable computer, and an electronic device with a parallel interface, e.g. a printer.

Figure 10A:
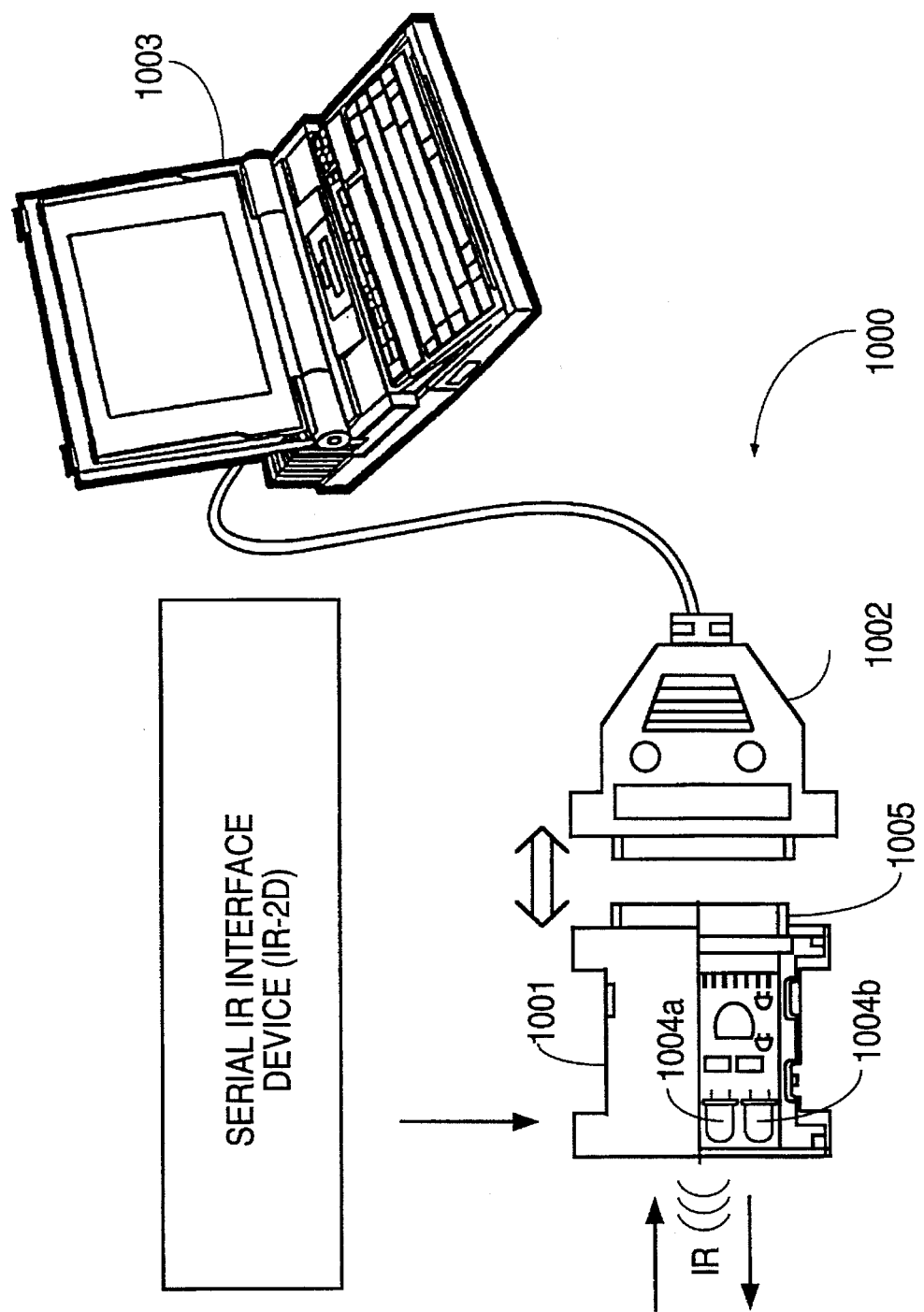
FIG. 10a shows a system 1000, including a portable computer 1003 connected to an IR interface device 1001 over a conventional serial link cable 1002, in accordance with the present invention.

FIG. 10a shows a system 1000, including a portable computer 1003 connected to an IR interface device 1001 over a conventional serial link cable 1002, in accordance with the present invention. IR interface device 1001 converts a conventional serial port, e.g. an RS232C port into an interface for IR communication. IR interface device 1001 is provided an industry standard DB25F 25-pin connector 1005 to couple to a conventional DB25M connector of link cable 1002. (Of course, IR interface device 1001 can also be directed coupled to the portable computer 1003.) IR interface device 1001 includes a PIN diode 1004a for receiving incoming IR signals and an IR LED 1004b for transmitting IR signals. PIN diode 1004a and IR LED 1004b can be implemented by the PIN diodes and IR LEDs discussed above. A block diagram of IR interface 1001 is provided in FIG. 11a.

Figure 11A:
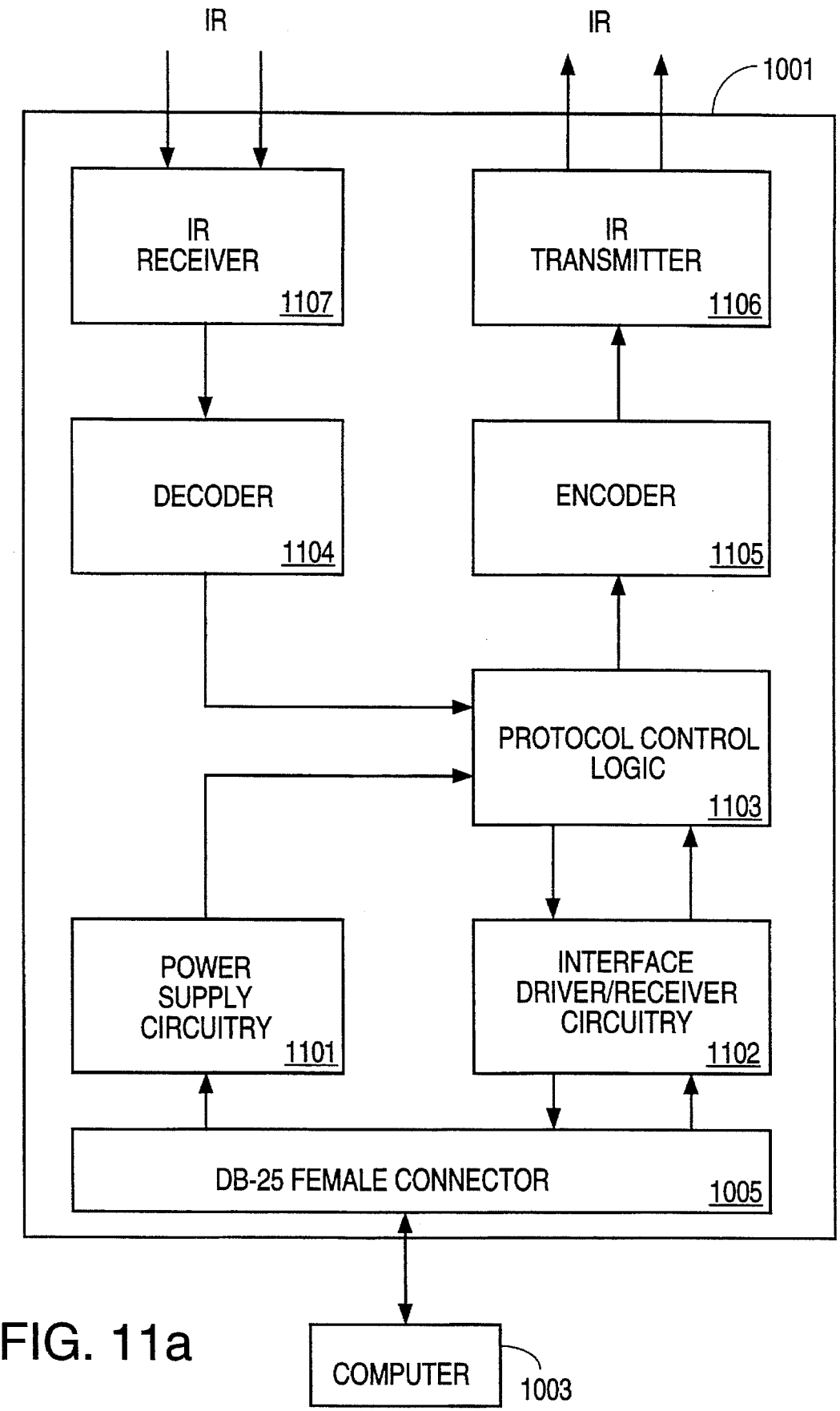

FIG. 11a is a block diagram of IR interface device 1001. As shown in FIG. 11a, IR signals are received into IR interface device 1001 through an IR receiver circuit 1107. The received IR signals are demodulated and decoded in decoder circuit 1104, in accordance with a signal modulation scheme. The data resulting from demodulating and decoding the received IR signals are provided to protocol control logic circuit 1103, which can then be relayed, through a host interface circuit 1102, to computer 1003. Conversely, data output from computer 1103 are provided as signals of a serial port of computer 1003. The output signals are provided through connector 1105 into host circuit interface 1102, through protocol control logic circuit 1103 and encoded, according to the signal modulation scheme, by encoder circuit 1105 for transmission through a transmitter circuit 1106. One implementation 1200 of IR interface device 1001 is shown in FIG. 12.

Figure 12A:
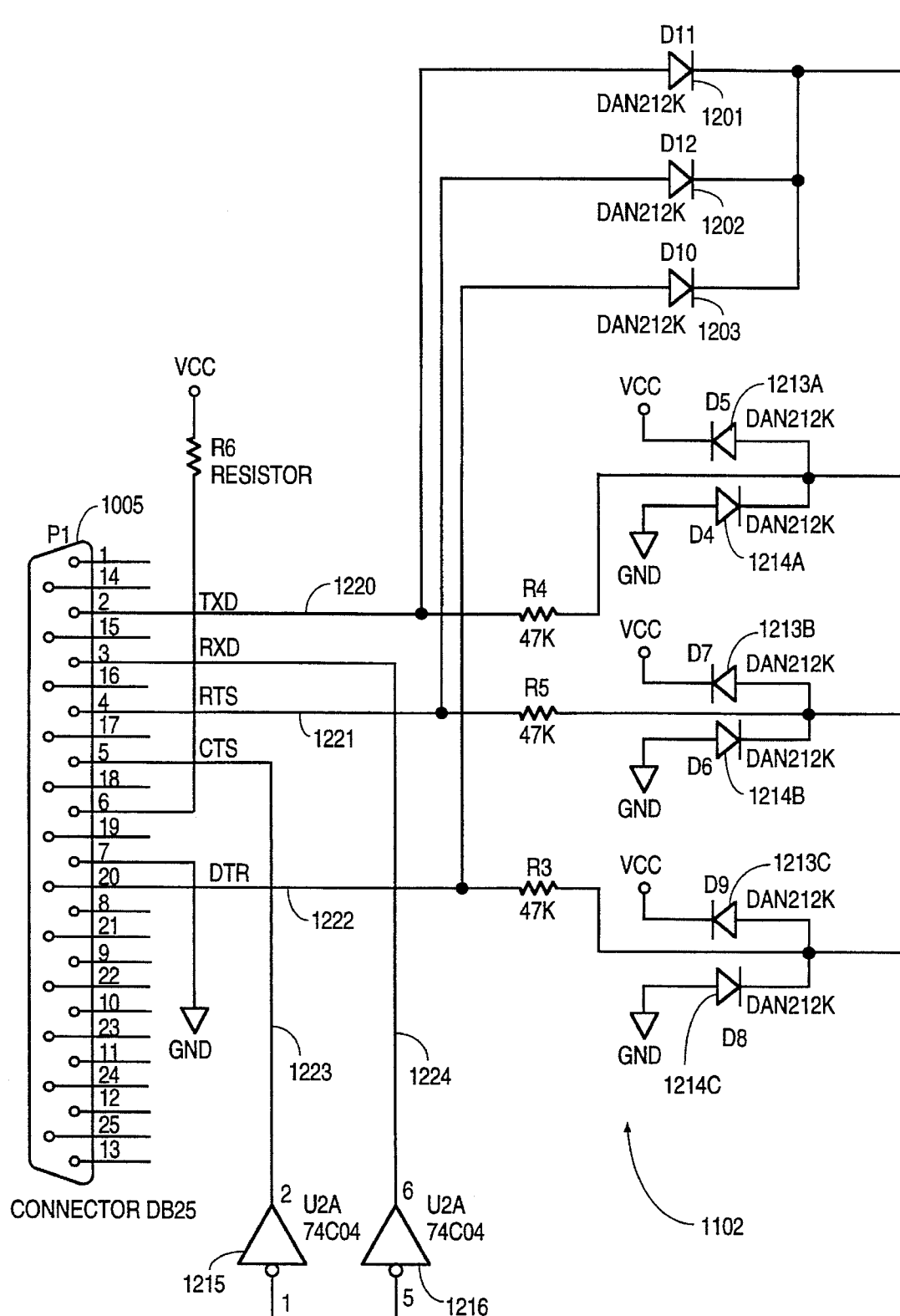
FIG. 12 is a schematic diagram showing one implementation of IR interface device 1001.
Figure 12B:
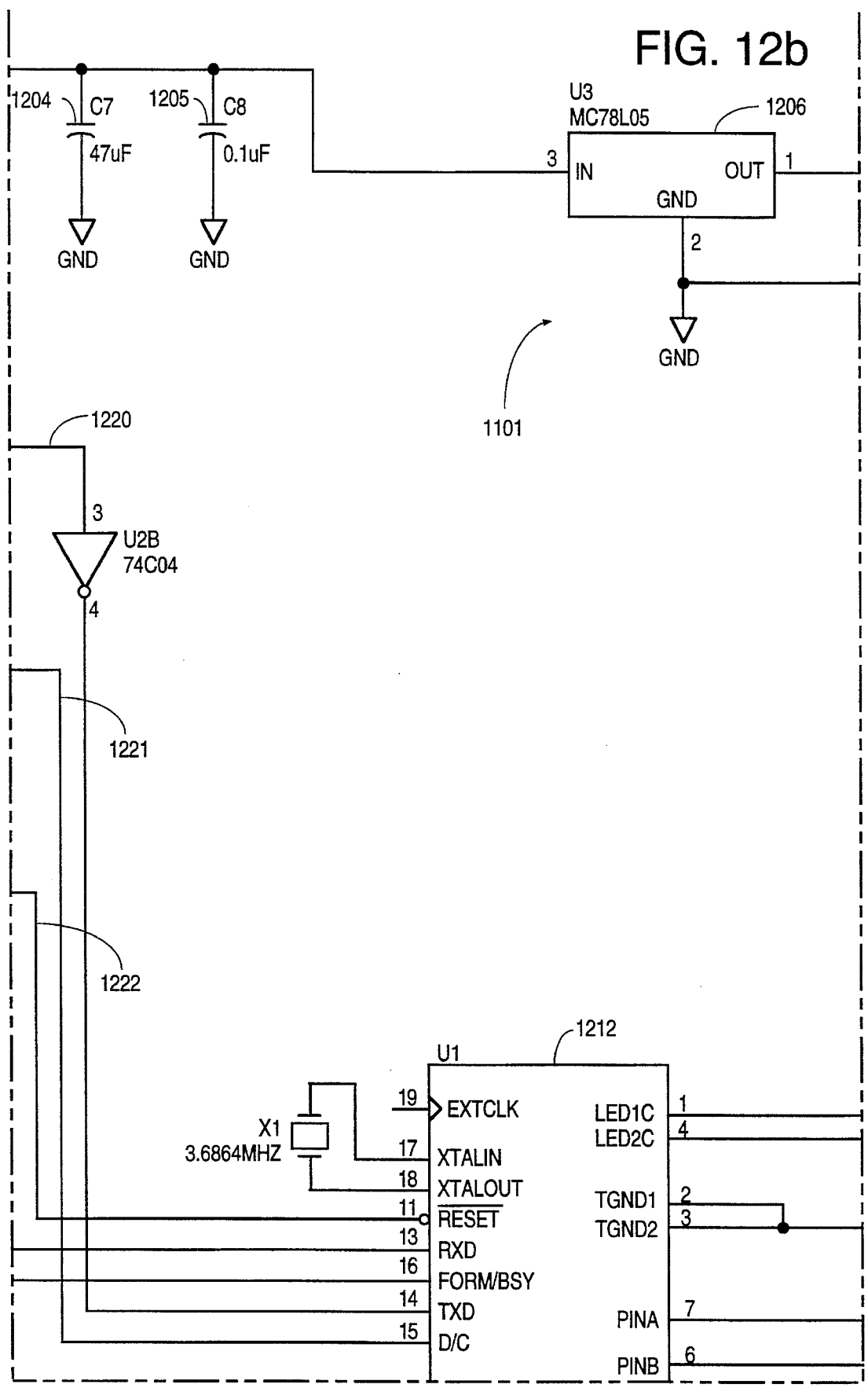

In the implementation 1200 of FIG. 12, IR receiver circuit 1107, IR transmitter circuit 1106, decoder circuit 1104, encoder circuit 1105 and protocol control logic circuit 1103 are implemented by a single integrated circuit 1212. Integrated circuit 1212 can be either IR transceiver integrated circuit 500 (FIG. 5) of the present invention or the CS8130 integrated circuit. Both IR transceiver integrated circuit 500 and the CS8130 integrated circuit are described above. As shown in FIG. 12, a DB25F 25-pin connector 1005, provides a common ground reference at pin 7, and output terminals 1220–1222, being signals "TXD", "RTS" and "DTR" respectively. Control signals "RTS" and "DTR" are provided as control signals "D/$\overline{C}$", and "$\overline{RESET}$", respectively, of integrated circuit 1212. In addition, connector 1005 also receives input signals "RXD" and "CTS" at terminals 1223 and 1224. Integrated circuit 1212's control signal "FORM/$\overline{BUSY}$" is provided as signal "CTS". Inverters 1215 and 1216 are provided to change the polarities of the "RXD" and "CTS" signals, as described above.

In FIG. 12, a power supply circuit 1101, corresponding to block 1101 of FIG. 11a, includes diodes 1201–1203, capacitors 1204–1205, voltage level converter 1206 and capacitors 1207–1208. Power supply circuit 1101 operates under the principles of the present invention described above with respect to FIG. 8. Diodes 1201–1203 each provide a charging current from the output signal lines 1220–1222 to charge capacitor 1204 to the RS232C voltage level, which is stepped-down by voltage level converter 1206 to CMOS voltage levels stored in capacitors 1207 and 1208. Voltage level conversion of signals "TXD", "RTS" and "DTR" at terminals 1220, 1221 and 1222 are provided, in accordance with the present invention described above with respect to FIG. 9, by diode pairs 1213a–1214a, 1213b–1214b and 1213c–1214c, respectively. In FIG. 12, PIN diode 1004a and IR LEDs 1209–1210 are shown to be controlled by integrated circuit 1212, and driven by voltage level converter 1206 at supply voltage $V_{cc}$. IR LEDs 1209–1210 correspond to IR LED 1004b of FIG. 10a.

Figure 10B:
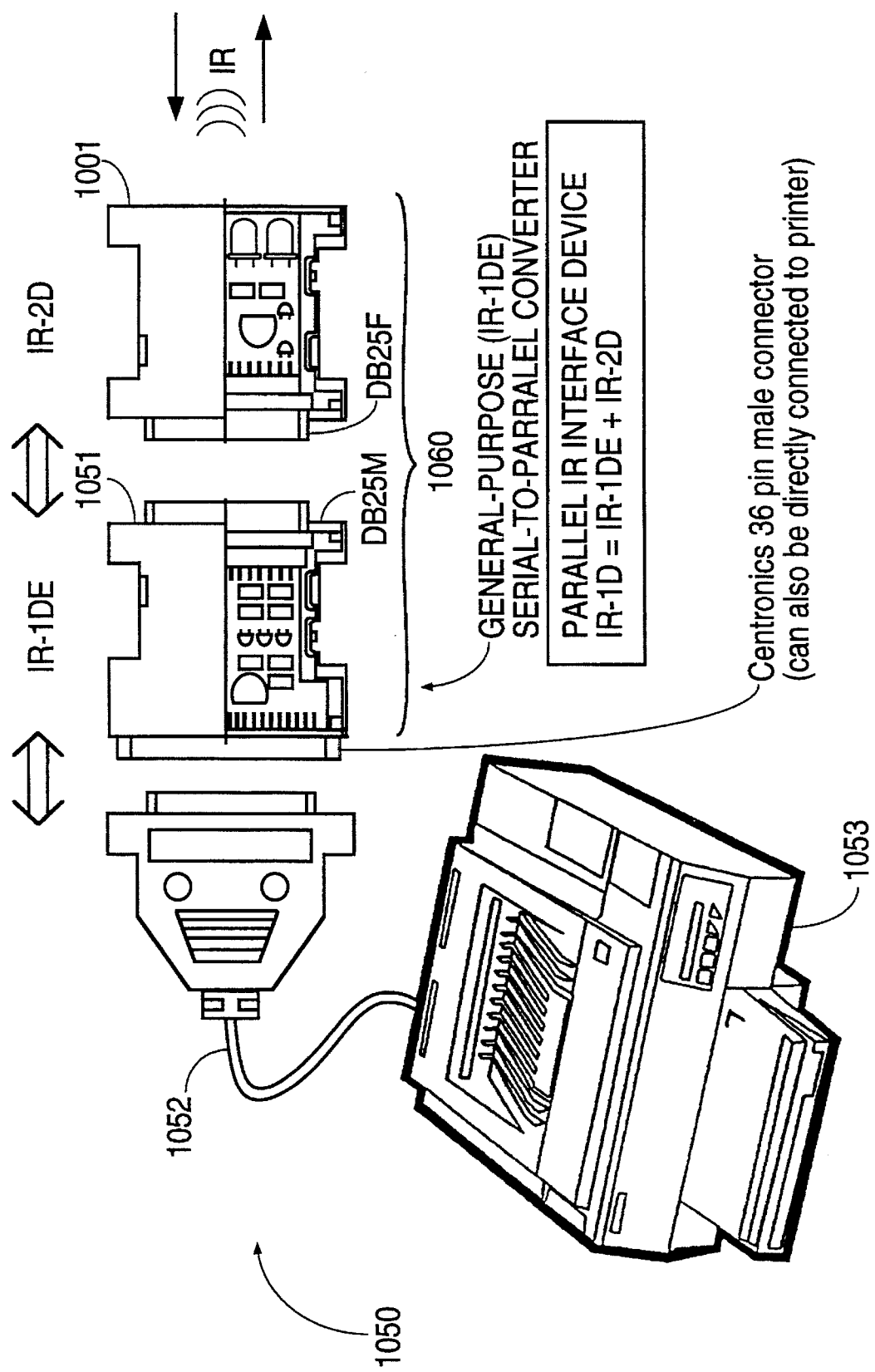

FIG. 10b shows a system 1050 that provides an IR interface to a printer 1053. Printer 1053 has a parallel port. In system 1050, an IR interface 1060 is formed by coupling IR parallel-to-serial interface device 1051 with IR interface device 1001 described above. IR interface 1060 is coupled to printer 1053 via a conventional connector link cable 1052 with a 36-pin "Centronics" female connector. Of course, IR interface 1060 can also be directly coupled to printer 1053. Parallel-to-serial interface device 1051 has, on one end, a conventional 36-pin male connector for coupling with the 36-pin female connector on link cable 1052. At the other end, parallel-to-serial interface device 1051 has a DB25M 25-pin serial male connector for coupling with the DB25F 25-pin serial female connector on IR interface device 1001.

Figure 11B:
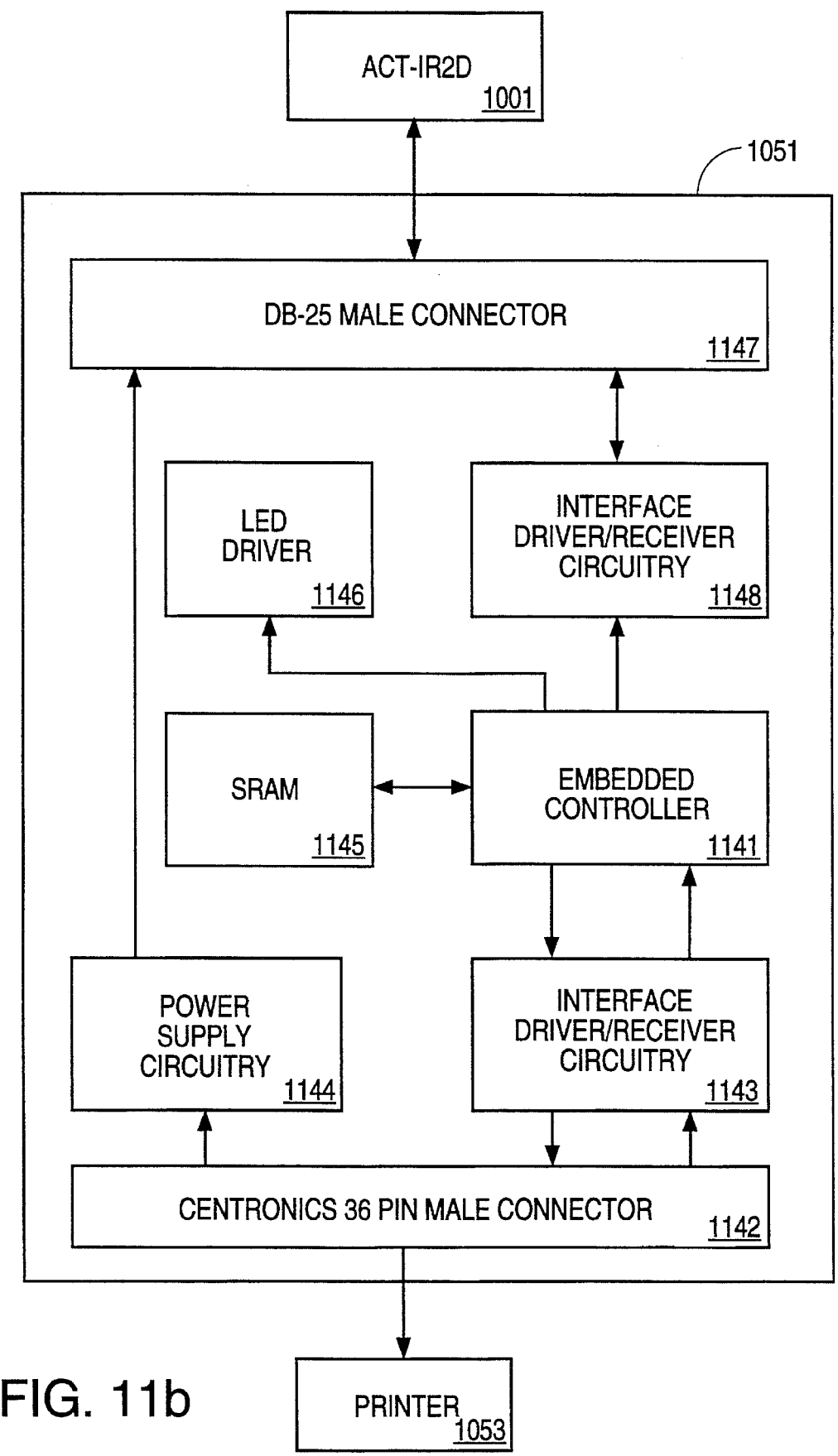
FIG. 11b is a block diagram of parallel-to-serial interface device 1051.

FIG. 11b is a block diagram of parallel-to-serial device 1051. As shown in FIG. 11b, parallel-to-serial interface device 1051 is coupled to IR interface device 1001 via a DB-25 male connector 1147 on one end, and to printer 1053 via a "Centronics" 36-pin male connector 1142 on the other end. Connectors 1142 and 1147 are driven by interface circuits 1143 and 1148 respectively, which are both controlled by embedded controller 1141. Embedded controller 1141 converts the serial data received from IR interface device 1001 into parallel data and receives status control signals from printer 1053. In this embodiment, embedded controller 1141 is a microprocessor which has its firmware stored in an on-chip read-only memory circuit, thereby eliminating the need for an additional non-volatile memory in parallel-to-serial interface device 1051. Embedded controller 1141 has access to a static random access memory 1145 for storage of temporary data. Embedded controller 1141 is also coupled to an LED driver 1146 to provide visual status indication of parallel-to-serial device 1051's operation.

Figures 1, 13A:
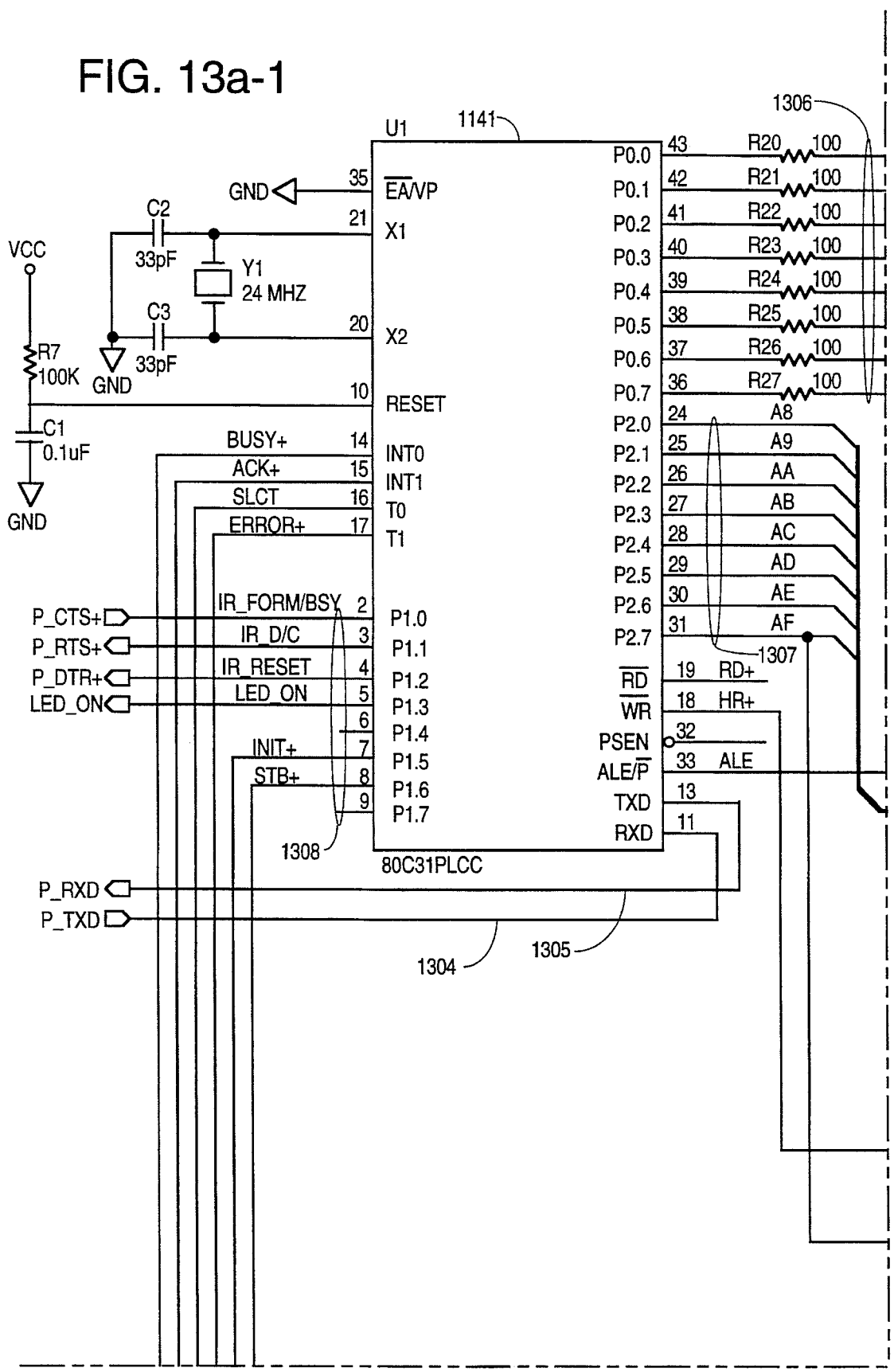
FIG. 13a is a schematic circuit of parallel-to-serial device 1051, showing embedded controller 1141, SRAM 1145, interface circuit 1143 and connector 1142.
Figures 2, 13A:
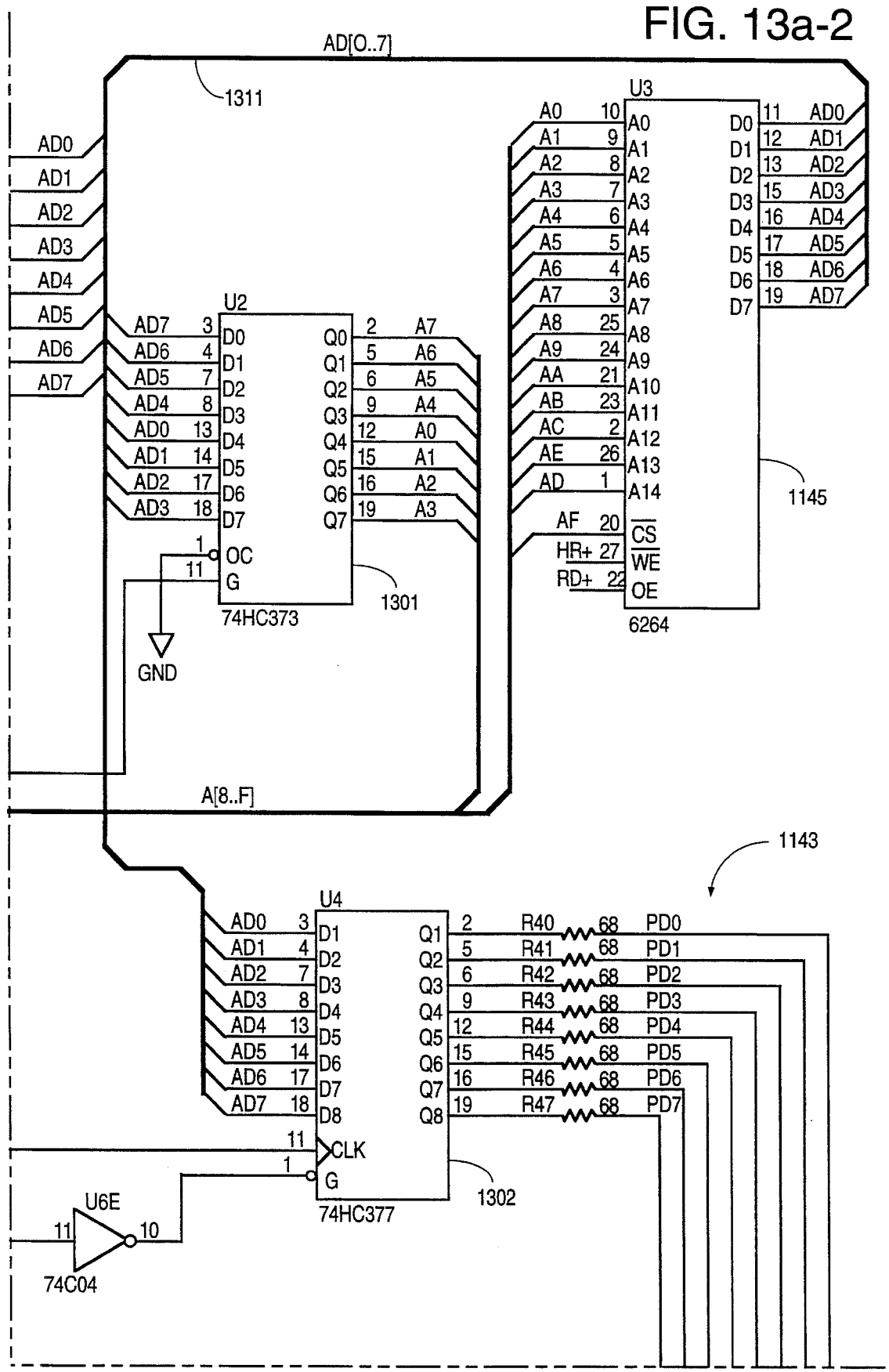
Figures 3, 13A:
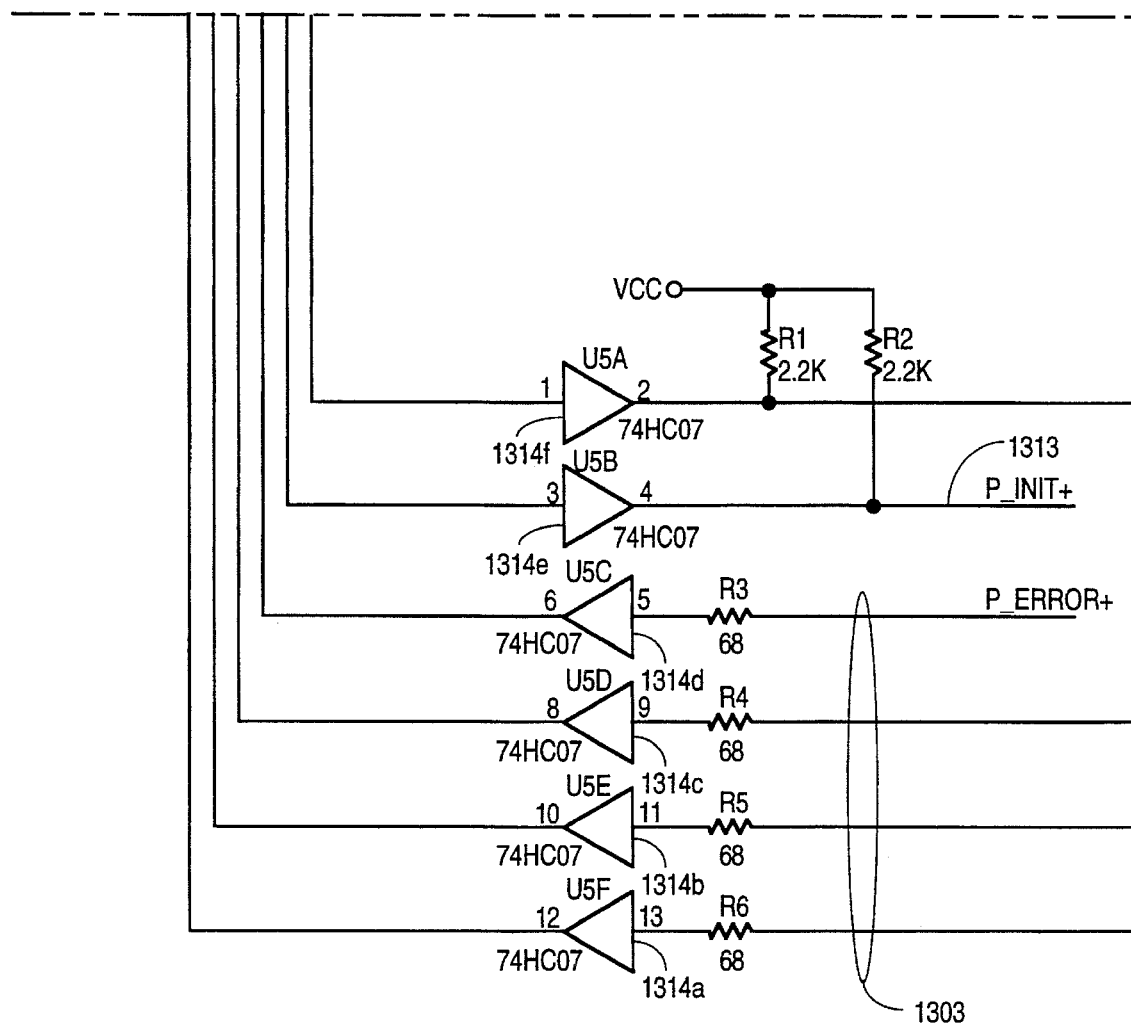
Figures 4, 13A:
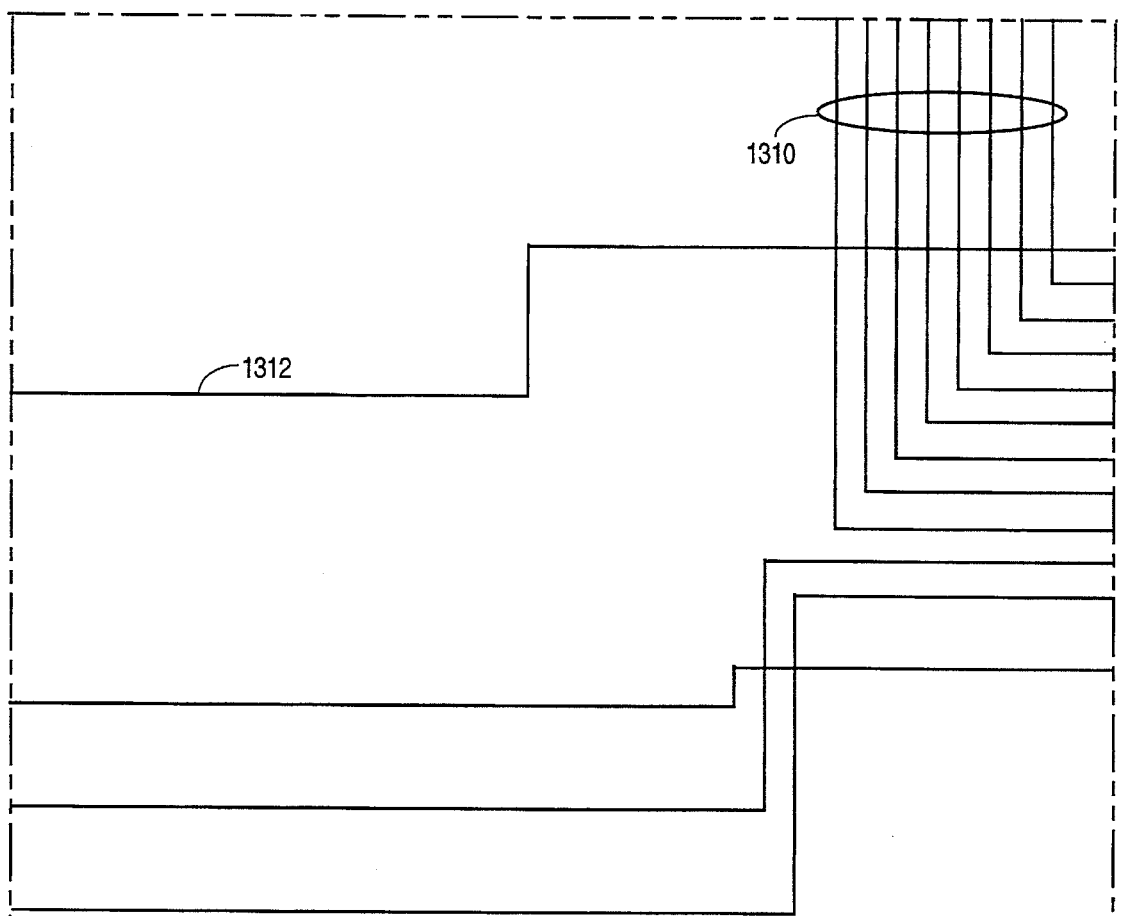
Figures 5, 13A:
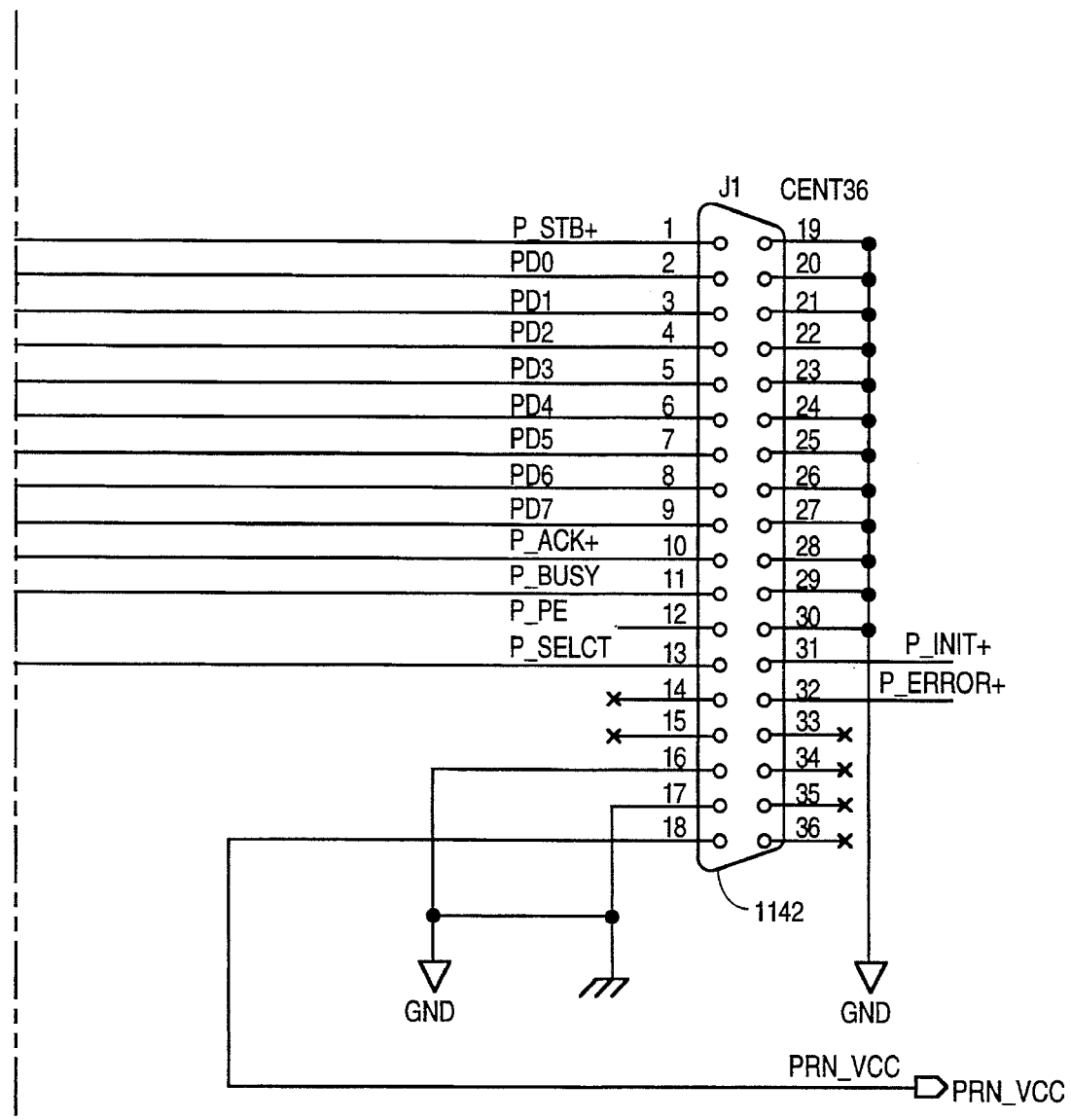

FIG. 13a is a schematic circuit of parallel-to-serial device 1051, showing embedded controller 1141, SRAM 1145, interface circuit 1143 and connector 1142. Embedded controller 1141 can be implemented, for example, by a 80C51 microprocessor available from Intel Corporation, Santa Clara, Calif. In this embodiment, the firmware for 80C51 is not stored in a PROM external to embedded controller 1141, but stored internally in a read-only memory (ROM) circuit. Such a ROM circuit is typically mask-programmed in the manufacturing process. In this embodiment, embedded controller 1141 provides three 8-bit input/output (I/O) busses 1306, 1307 and 1308. I/O bus 1306 is an 8-bit multiplexed address and data bus, I/O bus 1307 is an 8-bit address bus, and I/O bus 1308 is a general purpose input and output bus. During the first half of embedded controller 1141's instruction cycle, a 16-bit address is provided by embedded controller 1141 on busses 1306 (lower order 8 bits of the 16-bit address) and 1307 (higher order 8 bits of the 16-bit address). Since bus 1306 is used as an 8-bit data bus during the second half of embedded controller 1141's instruction cycle, the 8 lower order address bits of bus 1306 are latched into 8-bit latch 1301 prior to the second half of embedded controller 1141's instruction cycle. The 8-bit output value of latch 1301 and the eight address bits on bus 1307 form a 16-bit address to address SRAM 1145. In this embodiment, SRAM 1145 is implemented by a 6264 64K-bit SRAM with an 8-bit parallel output value. The output values of SRAM 1145 can be provided on address/data bus 1306. The content of address/data bus 1306 can be latched into 8-bit latch 1302. The output value of 8-bit latch 1302 is provided on bus 1310 for output to printer 1053 via printer interface 1142. Thus bus 1310 and 8-bit latch 1302 form interface circuit 1143 of FIG. 11b.

Four control signals "$\overline{ACK}$", "BUSY", "$\overline{ERROR}$", and "SLCT" are provided by printer 1053 through connector 1142 to the interrupt input signals of embedded controller 1141. In addition, two signals "$\overline{INIT}$" and "$\overline{STB}$" are received by printer 1053 through connector 1142. Control signals "$\overline{INIT}$" and "$\overline{STB}$" are generated by embedded controller 1141 at bits 5 and 6 of data bus 1308. Embedded controller generates the control signals "D/$\overline{C}$", and "$\overline{RESET}$" to control integrated circuit 1212 of IR interface device 1001. Signals "D/$\overline{C}$", and "$\overline{RESET}$" are generated on pins 4 and 20 of connector 1147, corresponding to the "RTS" and "DTR" pins of a RS232C interface (connector 1005). Data signals "TXD" and "RXD" are provided and received at terminals 1304 and 1305, respectively. In addition, embedded controller 1141 receives integrated circuit 1212's "FORM/BUSY" control signal at pin 5 of connector 1147, corresponding to signal "CTS" of a RS232C interface. A further control signal "LED ON" is also generated by embedded controller 1141 as bit 3 of data bus 1308 to drive an optional LED for providing a visual indication of activities in parallel-to-serial interface device 1051. The optional LED is driven by an LED driver 1146, which is shown in FIG. 13c. FIG. 13c shows the "LED ON" signal controlling the base terminal of PNP transistor 1323 which drives optional LED 1321. In FIG. 13a, inverters 1314a–1314f provide appropriate polarities of signals to ensure compatibility of the signal conventions used.

Figure 13B:
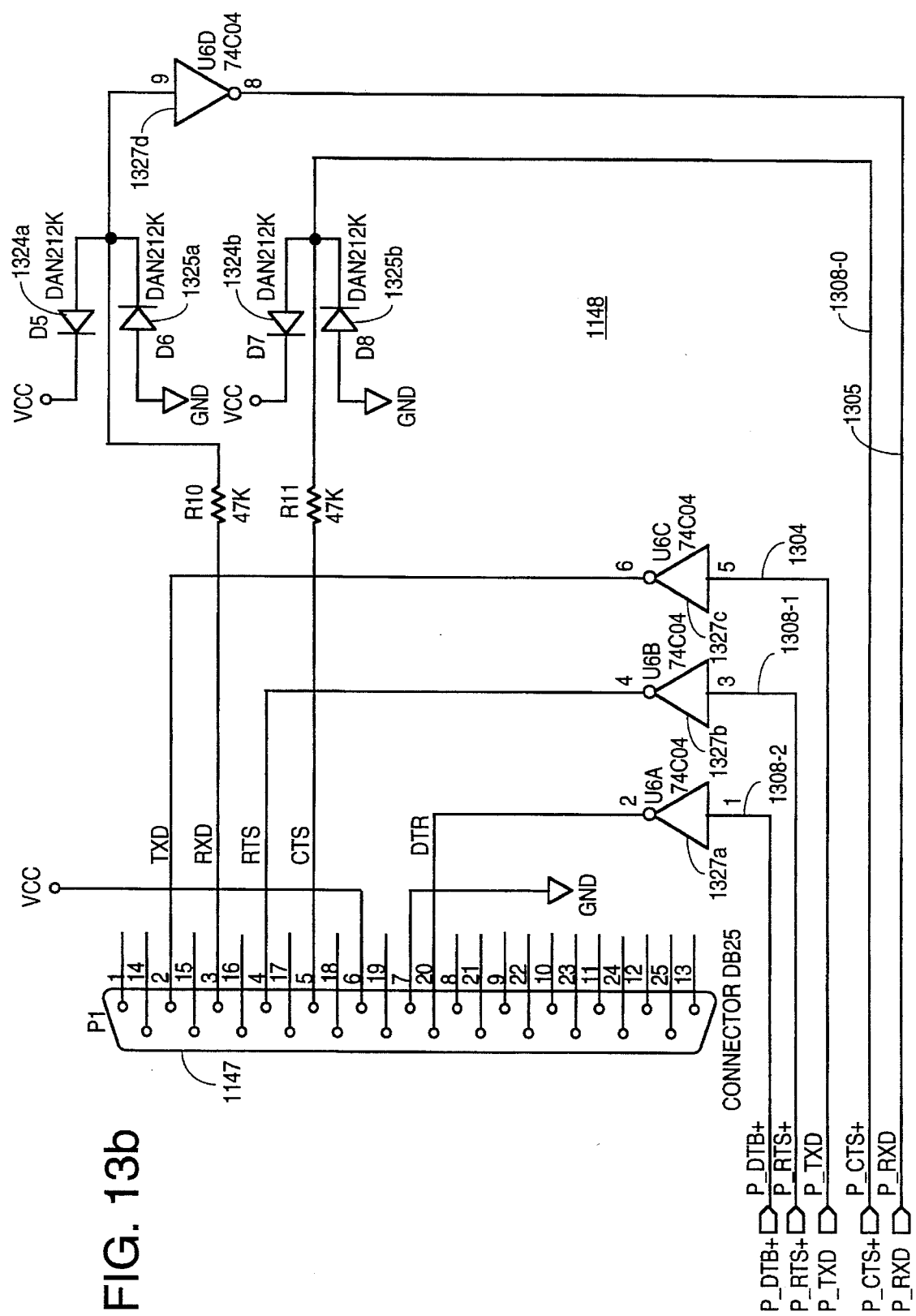
FIG. 13b is a schematic circuit of interface circuit 1148 of FIG. 11b.
Figure 13C:
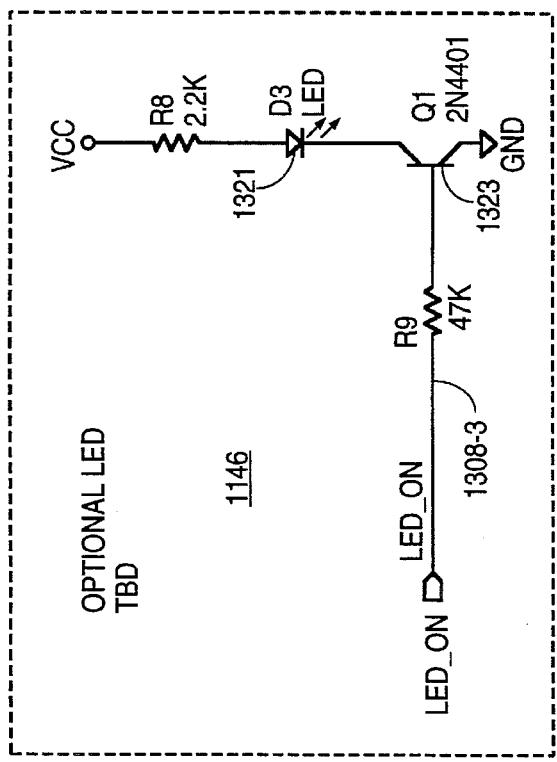
FIG. 13c is a schematic circuit of an LED driver 1146 of FIG. 11b for an optional LED.

FIG. 13b is a schematic diagram of interface circuit 1148 of FIG. 11b. As shown in FIG. 13b, signals TXD, RXD, RTS, CTS and DTR are provided to IR interface device 1001, through a DB-25M 25-pin connector 1147. For signals RXD and CTS received from IR interface device 1001, diode pairs 1324a–1325a and 1324b–1325b are provided to perform voltage level conversion in accordance with the present invention. Inverters 1327a–1327d provide appropriate polarities of signals to ensure compatibility of the signal conventions used.

Figure 13D:
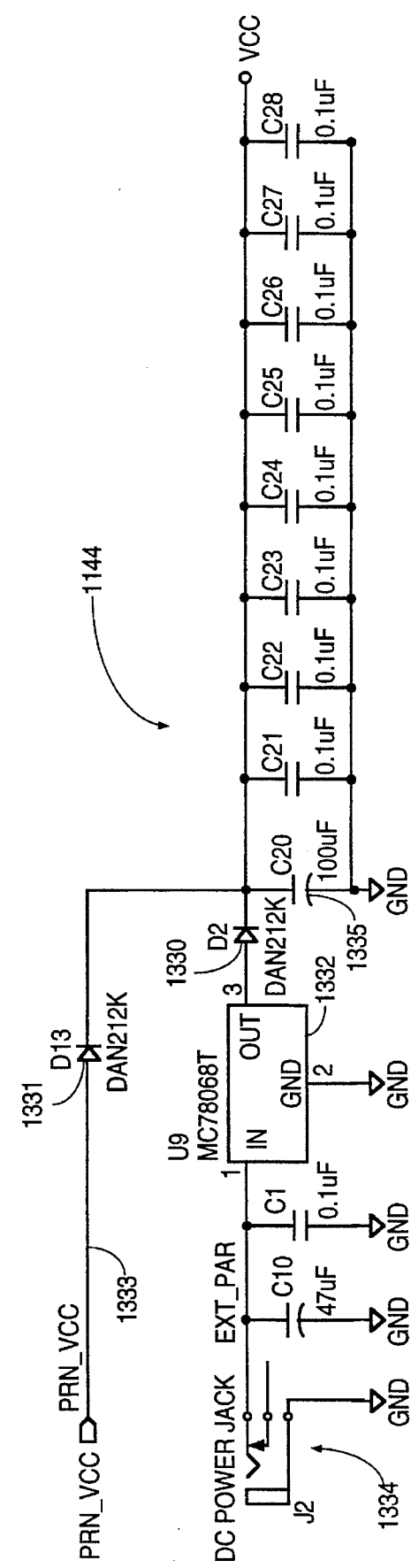
FIG. 13d is a schematic circuit of power supply circuit 1144 of FIG. 11b.

FIG. 13d is a schematic diagram of power supply circuit 1144 of FIG. 11b. In many printers, the 36-pin connector 1142 does not include a pin or pins from which a suitable supply voltage can be derived to power parallel-to-serial interface device 1051. Consequently, the present embodiment can be powered by either (i) pin 18 of the 36-pin connector 1142, when such pin is able to deliver the power required for the combination of parallel-to-serial interface device 1051 and IR interface device 1001, or (ii) an external power supply. As shown in FIG. 13d, power is provided either by printer 1053 via connector 1142 at terminal 1333, or coupled through a power jack 1334. An voltage regulator 1332 provides the voltage level necessary to operate the circuits of parallel-to-serial interface device 1051 and IR interface device 1001. Diodes 1331 and 1330 isolates each of the two power sources of power supply circuit 1144.

The above detailed description is provided to illustrate the specific embodiments of the present invention and is not intended to be limiting. Numerous variations and modifications within the scope of the present invention are possible. The present invention is defined by the following claims.

We claim:

1. An infrared radiation (IR) interface device, comprising:
   a wired port, connecting said IR interface device to a host computer, for receiving from said host computer a first data stream and for providing to said host computer a second data stream;
   an IR transceiver for transmitting data modulated for transmission as IR signals, and for receiving modulated data from IR signals detected;
   a modulation circuit, coupled to said IR transceiver and receiving a third data stream, modulating said first data stream to provide said data modulated for transmission;
   a demodulation circuit coupled to said IR transceiver, receiving from said IR transceiver said received modulated data to provide a fourth data stream;
   a program memory for storing a control program for said IR interface device;
   a data memory for temporarily storing data; and
   a central processing unit, coupled to said wired port, said program memory, said data memory, said modulation circuit, and said demodulating circuit, for executing said control program, so as (i) to store into said data memory said fourth data stream, (ii) to send as said third data stream said first data stream received over said wire port from said host computer to said modulation circuit; (iii) to retrieve said fourth data stream from said data memory and (iv) to send as said second data stream to said host computer said fourth data stream retrieved from data memory.

2. An IR interface device as in claim 1, further comprising a second wired port for providing to a second device said data received by said IR interface device.

3. An IR interface device as in claim 1, further comprising a power supply circuit, said power supply circuit receiving power from one of the following sources: (i) an external power supply, (ii) a battery housed in said IR interface device, and (iii) a signal of said host computer coupled to said wired port.

4. An infrared radiation (IR) interface device as in claim 1, wherein said IR transceiver comprises:
   a control circuit for processing data received and data to be transmitted as IR signals;
   a subcarrier generator circuit for generating a subcarrier signal;
   a modulator circuit, coupled to said control circuit and said subcarrier generator circuit, for modulating said data to be transmitted with said subcarrier signal to provide a modulated data signal;
   a driver circuit for driving an external light emitting diode in accordance with said modulated data signal;
   a receiver circuit for (i) amplifying and detecting IR signals received in an external photodetector and (ii) providing said IR signals to said control circuit as said data received;
   an automatic gain control circuit, coupled to said receiver circuit for adjusting the gain in said receiver circuit, in accordance with strengths of said IR signals received; and
   a transmitter-active detection circuit for detecting a transmission time of said data to be transmitted, and for disabling said automatic gain control circuit for a period of time equal to said transmission time plus a predetermine time period.

5. An infrared radiation (IR) interface device as in claim 4, wherein said IR transceiver further includes a power management circuit, said power management circuit providing a "power-down" signal when said power management circuit detects a time period of a predetermined length during which neither data received nor data to be transmitted are processed in said control circuit.

6. An infrared radiation (IR) interface device as in claim 4, wherein said IR transceiver receives control signals from a host device at a predetermined baud rate.

7. An infrared radiation (IR) interface device as in claim 4, further comprising a power supply circuit for receiving power from said host computer over said wired port, said wired port having a ground terminal for coupling to a ground terminal of said host computer, said power supply circuit comprising:
   a ground terminal coupled to said ground terminal of said wired port to form a common ground terminal;
   a diode having an anode and a cathode, said anode of said diode being coupled to a signal line of said wired port;
   a capacitor coupled between said common ground terminal and said cathode of said diode, such that said signal line charges said capacitor through said diode with a charging current;

a step-down voltage converter coupled to said capacitor for providing a supply current larger than said charging current in said signal line; and a power supply terminal for coupling said supply current to circuits in said IR interface device.

8. An infrared (IR) interface device as in claim 7, wherein said signal line attains a voltage higher than a voltage at said power supply terminal.

9. An infrared (IR) interface circuit as in claim 7, wherein said signal line is coupled in series to a resistor for limiting currents in said first and second diodes.

10. An infrared (IR) interface device as in claim 4, wherein said wired port is a RS232C port, said IR interface device operating at CMOS voltage levels, and wherein said signal line carries an output signal of said RS232C port.

11. An infrared (IR) interface device as in claim 4, wherein said host computer is a palmtop computer.

12. An infrared radiation (IR) conference device, comprising:

a housing including first and second windows suitable for transmitting IR signals;

first and second IR transceivers, each IR transceiver located within said housing behind a corresponding window for transmitting data as IR signals through said corresponding window, and for receiving modulated data from IR signals detected through said corresponding window; and a central processing unit, coupled to said first and second IR transceivers, for (i) demodulating data received at said first window from a first device, in accordance with a first signal modulation scheme, and modulating said data received at said first window, in accordance with a second signal modulation scheme, for transmission at said second window to a second device, and (ii) demodulating data received at said second window from said second device, in accordance with said second signal modulation scheme, and modulating said data received at said second window, in accordance with said first signal modulation scheme, for transmission at said first window to said first device.

13. An IR conference device as in claim 12, wherein said central processing unit establishes (i) a first communication link with said first device, in accordance with a first protocol, and (ii) a second communication link with said second device, in accordance with a second protocol.

14. An IR conference device as in claim 12, further comprising a third window, wherein said central processing unit modulates data received from said first device at said first window for transmission at said third window to a third device, in accordance with a third signal modulation scheme, simultaneously modulating said data received from said first device at said first window for transmission at said second window to said second device, in accordance with said second signal modulation scheme.

15. An IR conference device as in claim 12, further comprises a non-volatile semiconductor memory for storing firmware executed by said central processing unit.

16. An IR interface device as in claim 12, further comprising a random access memory for storing data received by said IR conference device.

17. An IR conference device as in claim 12, further comprising a power supply circuit, said power supply circuit receiving power from one of the following sources: (i) an external power supply, and (ii) a battery housed in said housing.

18. An infrared radiation (IR) interface device, comprising:

a first interface circuit, including a serial port connector, for transmitting data and receiving data to and from a serial port of a first electronic device coupled via said serial port connector;

an IR transceiver circuit for receiving and transmitting IR signals in accordance with a signal demodulation scheme and a signal modulation scheme, respectively;

a programmable protocol control logic circuit, coupled to said first interface circuit and said IR transceiver circuits, said programmable protocol control logic circuit being programmable by said first electronic device over said serial port, for (i) receiving said demodulated IR signals, extracting data from said demodulated IR signals, and providing said extracted data to said first interface circuit for transmission to said first electronic device; (ii) receiving data from said electronic device, and providing said data received from said first electronics device to said interface circuit, for transmission as IR signals under said signal modulation scheme.

19. An infrared radiation (IR) interface device as in claim 18, wherein said IR transceiver circuit and said protocol control logic circuit is included in an IR transceiver integrated circuit.

20. An infrared radiation (IR) interface device as in claim 18, wherein said IR interface device is powered by said electronic device via a signal line in said serial connector.

21. An infrared radiation (IR) interface device, comprising:

a first interface circuit, including a serial port connector, for transmitting data and receiving data to and from a serial port of a first electronic device coupled via said serial port connector;

an IR transceiver circuit for receiving and transmitting IR signals in accordance with a signal demodulation scheme and a signal modulation scheme, respectively;

a protocol control logic circuit, coupled to said first interface circuit and said IR transceiver circuits, for (i) receiving said demodulated IR signals, extracting data from said demodulated IR signals, and providing said extracted data to said first interface circuit for transmission to said first electronic device; (ii) receiving data from said electronic device, and providing said data received from said first electronics device to said interface circuit, for transmission as IR signals under said signal modulation scheme;

wherein said first electronic device comprises a parallel-to-serial interface device, said parallel-to-serial interface device comprising:

a second interface circuit, including a parallel port connector, for transmitting data and receiving data from a parallel port of a second electronic device coupled via said parallel port connector; and an embedded controller, coupled to said second interface circuit for (i) providing said data received from said parallel port of said second electronic device serially to said first interface circuit via said serial port connector; and (ii) providing said data transmitted on said serial port to said second interface circuit for transmission to said second electronic device over said parallel port.

22. An infrared radiation (IR) interface device as in claim 21, further comprising static random access memory accessed by said embedded controller.

23. An infrared radiation (IR) interface device as in claim 21, wherein said embedded controller includes a mask-programmed read-only memory.

* * * * *